United States Patent
da Rosa et al.

(10) Patent No.: US 12,496,959 B2
(45) Date of Patent: *Dec. 16, 2025

(54) REMOTELY ADJUSTABLE CAPTIVE BEAM SYSTEM

(71) Applicant: Ancra International LLC, Azusa, CA (US)

(72) Inventors: Joaquim Carlos da Rosa, Independence, KY (US); Jerome T. Jones, Independence, KY (US); Lawrence C. Bethel, Cleves, OH (US); Gregory A. Kauffman, Cincinnati, OH (US)

(73) Assignee: Ancra International LLC, Azusa, CA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 17/532,311

(22) Filed: Nov. 22, 2021

(65) Prior Publication Data

US 2022/0080877 A1 Mar. 17, 2022

Related U.S. Application Data

(62) Division of application No. 16/285,949, filed on Feb. 26, 2019, now Pat. No. 11,208,028.

(60) Provisional application No. 62/637,687, filed on Mar. 2, 2018.

(51) Int. Cl.
*B60P 7/08* (2006.01)
*B60P 7/15* (2006.01)
*B61D 45/00* (2006.01)

(52) U.S. Cl.
CPC .............. *B60P 7/15* (2013.01); *B61D 45/001* (2013.01)

(58) Field of Classification Search
CPC ......... B60P 7/15; B60P 7/0892; B60P 7/0815; E05C 2003/128
USPC ............................................ 410/89, 144–150
See application file for complete search history.

(56) References Cited

U.S. PATENT DOCUMENTS

| | | | |
|---|---|---|---|
| 2,513,348 | A | 7/1950 | Nampa |
| 2,575,751 | A | 11/1951 | Donnelley |
| 3,493,263 | A | 2/1970 | Brown |
| 3,575,456 | A | 4/1971 | Austin |

(Continued)

FOREIGN PATENT DOCUMENTS

| | | |
|---|---|---|
| DE | 197 06 493 A1 | 8/1998 |
| DE | 10 2010 037 753 A1 | 3/2012 |

(Continued)

OTHER PUBLICATIONS

Office Action received for Australian Patent Application No. 2019204046, mailed on Feb. 17, 2024, 4 pages.

(Continued)

*Primary Examiner* — Stephen T Gordon
(74) *Attorney, Agent, or Firm* — Shook, Hardy & Bacon L.L.P.

(57) ABSTRACT

A system and method for automatically and remotely adjusting the position of a captive beam is provided. The system includes a motor that moves a bracket along a vertical track, with the bracket supporting an end of the captive beam. The bracket rotatably supports a latch that engages an aperture in a track when aligned therewith to allow track to support the load of the captive beam and the load supported by the captive beam.

10 Claims, 23 Drawing Sheets

(56) References Cited

U.S. PATENT DOCUMENTS

| | | | | |
|---|---|---|---|---|
| 4,256,425 | A * | 3/1981 | Burgess | B61D 45/00 |
| | | | | 410/150 |
| 4,494,896 | A * | 1/1985 | DiFranco | B60P 3/00 |
| | | | | 410/148 |
| 5,338,137 | A | 8/1994 | Jensen | |
| 5,938,382 | A | 8/1999 | Andre | |
| 6,074,143 | A | 6/2000 | Langston et al. | |
| 6,315,346 | B1 | 11/2001 | Martin | |
| 6,702,533 | B1 | 3/2004 | Williams et al. | |
| 6,739,811 | B1 | 5/2004 | Petelka | |
| 7,134,820 | B2 | 11/2006 | Ehrlich | |
| 8,297,896 | B2 | 10/2012 | Draisbach | |
| 8,388,287 | B2 | 3/2013 | Arnold et al. | |
| 8,757,944 | B2 | 6/2014 | Calico | |
| 8,979,451 | B2 | 3/2015 | Downing | |
| 9,090,191 | B2 | 7/2015 | Squyres | |
| 9,090,192 | B2 | 7/2015 | Squyres | |
| 9,199,572 | B2 | 12/2015 | Squyres | |
| 9,505,337 | B1 | 11/2016 | Squyres | |
| 9,566,895 | B2 | 2/2017 | Knox | |
| 11,208,028 | B2 * | 12/2021 | Da Rosa | B60P 7/15 |
| 2008/0131227 | A1 | 6/2008 | Maresh | |
| 2011/0142564 | A1 | 6/2011 | Kaburick | |
| 2013/0266393 | A1 | 10/2013 | Calico | |
| 2014/0369782 | A1 | 12/2014 | Reid | |
| 2015/0110568 | A1 | 4/2015 | Squyres | |
| 2015/0110570 | A1 | 4/2015 | Squyres | |
| 2016/0082875 | A1 | 3/2016 | Squyres | |
| 2016/0114717 | A1 | 4/2016 | Squyres | |
| 2018/0050630 | A1 | 2/2018 | Kauffman et al. | |

FOREIGN PATENT DOCUMENTS

| | | |
|---|---|---|
| DE | 20 2013 103 876 U1 | 9/2013 |
| EP | 0 698 545 A1 | 9/1994 |
| EP | 1 659 023 A1 | 11/2004 |
| EP | 1 857 323 B1 | 5/2007 |
| GB | 2 228 453 A | 8/1990 |
| JP | 2001-334862 A | 12/2001 |
| WO | 2015/028467 A1 | 3/2015 |

OTHER PUBLICATIONS

Office Action received for Canadian Patent Application No. 3046445, mailed on Nov. 20, 2023, 6 pages.
European Search Report and Search Opinion received for European Application No. 20171592.7, mailed on Sep. 2, 2020, 7 pages.
Intention to grant received for European Application No. 19721507.2, mailed on Jan. 15, 2020, 8 pages.
Intention to grant received for European Application No. 20171592.7, mailed on Aug. 4, 2021, 8 pages.
International Preliminary Report on Patentability received for PCT Patent Application No. PCT/US2019/019581, mailed on Sep. 17, 2020, 6 pages.
International Search Report for PCT/US2019/019581, dated Apr. 15, 2019, 2 pp.
Written Opinion for PCT/US2019/019581, dated Apr. 15, 2019, 4 pp.
Extended European Search Report for EP 19 72 1507, dated Oct. 17, 2019, 7 pp.

* cited by examiner

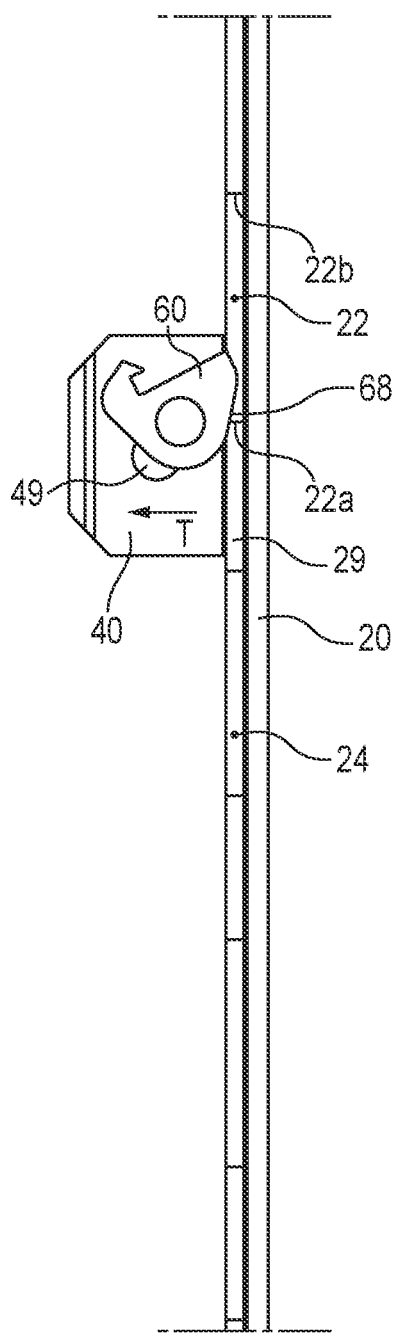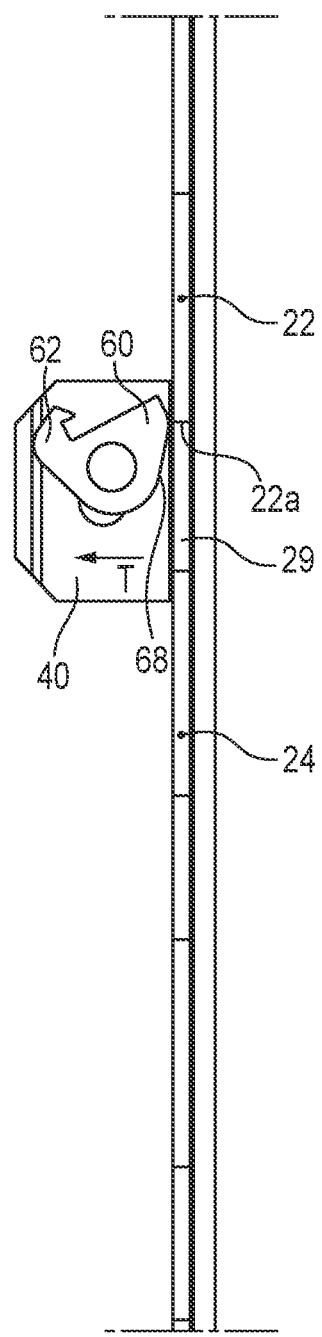
FIG. 5                    FIG. 6

REMOTELY ADJUSTABLE CAPTIVE BEAM SYSTEM

CROSS-REFERENCE TO RELATED APPLICATIONS

The present patent document is a divisional application that claims the benefit of priority under 35 U.S.C. § 121 of U.S. patent application Ser. No. 16/285,949, filed Feb. 26, 2019, which claims the benefit of priority of U.S. Provisional Application Ser. No. 62/637,687, filed Mar. 2, 2018, each of which are hereby incorporated by reference in their entirety.

TECHNICAL FIELD

The disclosure relates to captive beam systems. Captive beam systems include decking beams with components that slide within vertical tracks fixed to opposite walls of a cargo compartment. The beam can be stowed close to the ceiling of the cargo compartment when not needed for use, and can be selectively lowered to a position for loading cargo or for shoring purposes. The ends of the beams slide within the track and include locking features that can selectively the ends of the beams with respect to the tracks at various heights along the track. The adjustment of height of captive beams is a manual process and often requires operators to load and unload a cargo compartment, a first operator to raise and lower the captive beams as desired and a second operator to drive a forklift to insert or remove the cargo from the cargo compartment. An automated method to raise and lower captive beams is desired to allow a single operator to efficiently load or unload a cargo compartment.

BRIEF SUMMARY

A first representative embodiment of the disclosure is provided. The embodiment includes a remotely adjustable decking system. The system includes first and second vertical tracks that are configured to be installed upon opposing walls of cargo compartment, each of the first and second vertical tracks comprise a plurality of apertures disposed spacingly therealong, first and second brackets that each slide along the respective first and second tracks, and first and second motors that are disposed in conjunction with the respective first and second tracks, wherein each of the first and second motors are operatively engaged with each of the respective first and second brackets with a transmission, wherein operation of each motor in a first direction causes the respective bracket to slide upwardly along the respective track and operation of each motor in an opposite second direction causes the respective bracket to slide downwardly along the respective track. A controller with user input capability is provided, wherein the controller selectively controls the operation of the first and second motors to selectively raise or lower a vertical position one or both of the first and second brackets upon the respective first and second tracks in response to an input received from an input device.

Another representative embodiment of the disclosure is provided. The representative embodiment is a latch for use with a remotely adjustable decking system to selectively position a bracket upon a track. The latch includes a rotating portion rotatably mounted upon the bracket and is biased by a first spring and a guide rotatably connected to the rotating portion and biased toward the rotating portion by a second spring.

Another representative embodiment of the disclosure is provided. The representative embodiment is a method for adjusting a decking system. The method includes the steps of providing first and second vertical tracks on opposite walls of a cargo compartment, each of the first and second vertical tracks comprising a plurality of apertures disposed spacingly therealong, with first and second brackets slidably mounted upon the respective first and second vertical tracks, and first and second motors disposed in conjunction with the respective first and second tracks, wherein each of the first and second motors are operatively engaged with the respective first and second brackets with a transmission, wherein operation of each motor in a first direction causes the respective bracket to slide upwardly along the respective track and operation of each motor in an opposite second direction causes the respective bracket to slide downwardly along the respective track, and controlling the vertical position of the first and second brackets along the respective first and second tracks, based upon inputs from a user from an input device, by selectively controlling the operation of the first and second motors to selectively raise or lower a vertical position of one or both of the first and second brackets upon the respective first and second tracks.

The above method may additionally include a method for lowering one of the first and second brackets along the respective vertical track from a position in registration with a first aperture of the plurality of apertures to a second position in registration with a second aperture below the first aperture. Then raising the bracket to a position where a latch rotatably mounted upon the bracket and biased by a spring is fully aligned with the first aperture, which causes the latch to rotate in a first rotational direction such that a portion of the latch extends into the first aperture and a finger of the latch extends outside of the first aperture due to a biasing force of the spring. Then lowering the bracket such that a cam surface contacts a lower edge of the first aperture, and then lowering the bracket until the bracket is in registration with a third aperture that is below the second aperture. Then raising the bracket such that a second cam surface of the latch contacts an upper edge of the third aperture, which urges the latch to rotate in a second direction, opposite to the first direction, such that the finger of the latch is aligned to extend into the second aperture when the bracket is further raised toward registration with the second aperture, stopping vertical motion of the bracket when reaching a position where the finger extends into the second aperture, such that the finger rests upon a lower edge of the second aperture.

The above method may additionally include another method for lowering one of the first and second brackets along the respective vertical track from a position in registration with a first aperture of the plurality of apertures to a second position in registration with a second aperture below the first aperture. The method includes raising the bracket to a position where a latch rotatably mounted upon the bracket and biased by a spring is fully aligned with the first aperture, which causes the latch to rotate in a first rotational direction such that a guide of the latch extends into the first aperture and contacts a rotating portion of the latch. Then lowering the bracket such that a sixth surface of the latch contacts a lower edge of the first aperture, and then lowering the bracket until the bracket is in registration with a third aperture that is below the second aperture. Then raising the bracket such that a third surface and a fifth surface of the latch consecutively contacts an upper edge of the third aperture, which urges the latch to rotate in a second rotational direction opposite to the first rotational direction, such that a lower portion of the rotating portion of the latch is aligned to extend into the second aperture when the bracket is further raised toward registration with the second aperture. Then lowering the bracket such that a fourth surface of the latch rests upon a lower edge of the second aperture and the guide is biased against a track position between the second and third apertures.

One or all of the above methods may include a method for raising one of the first and second brackets along the respective track from a position in registration with a first aperture of the plurality of apertures to a second position in registration with a second aperture above the first aperture. The method includes raising the bracket to a positon where a latch rotatably mounted upon the bracket and biased by a spring is fully aligned with the first aperture, which causes the latch to rotate in a first rotational direction such that a portion of the latch extends into the first aperture and a finger of the latch extends outside of the first aperture due a biasing force of the spring. Then continuing to raise the bracket until a flat cam surface of the latch contacts an upper edge of the first aperture, which causes the latch to rotate in a second direction opposite to the first direction, such that a finger of the latch is aligned to extend into the second aperture when the bracket is further raised toward registration with the second aperture. Then stopping vertical motion of the bracket when reaching a position where the finger extends into the second aperture, such that the finger rests upon a lower edge of the second aperture.

One or all of the above methods may include another method for raising one of the first and second brackets along the respective track from a position in registration with a first aperture of the plurality of apertures to a second position in registration with a second aperture above the first aperture. The method includes raising the bracket to a position where a latch rotatably mounted upon the bracket and biased by a spring is fully aligned with the first aperture, which causes the latch to rotate in a first rotational direction such that a guide of the latch extends into the first aperture and contacts a rotating portion of the latch. Then continuing to raise the bracket such that a third surface and a fifth surface of the latch consecutively contact an upper edge of the first aperture, which urges the latch to rotate in a second rotational direction opposite to the first rotational direction, such that a lower portion of the rotating portion of the latch is aligned to extend into the second aperture when the bracket is further raised toward registration with the second aperture. Then lowering the bracket such that a fourth surface of the latch rests upon a lower edge of the second aperture and the guide is biased against a track position between the first and second apertures.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIGS. 3-11 are side cross-sectional images of the bracket and latch with respect to the track as the alignment of the bracket is lowered from initial alignment with aperture 22 to final alignment with aperture 24. The images are depicted with the spring removed for simplicity, but the spring when provided bears against the bracket to urge the latch to rotate and slide with respect to the bracket and the track.

DETAILED DESCRIPTION OF THE DRAWINGS AND THE PRESENTLY PREFERRED EMBODIMENTS

Figure 1:
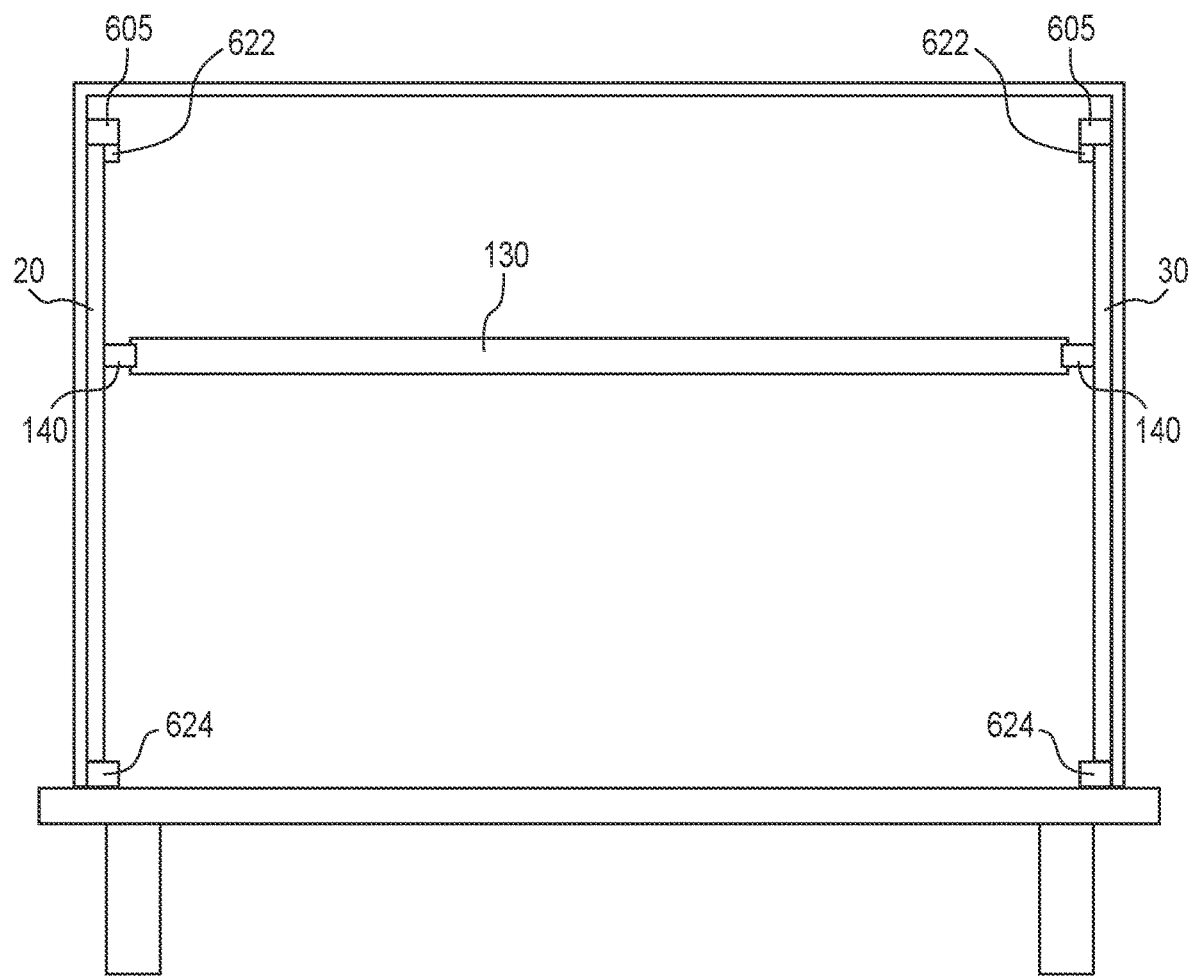
FIG. 1 is a schematic rear view of a captive beam system connected to opposite side walls of a cargo compartment, such as a trailer.

Turning now to FIGS. 1-18, a remotely operable system for controlling a captive beam 10 is provided. The system 10 allows for selectively raising and lowering a beam 130 that is operatively engaged between first and second tracks 20, 30 that are mounted upon opposite walls within a cargo container, such as the cargo compartment of a semi-trailer. The system 10 is provided to allow for a user to remotely set a height of the beam 130 with the cargo compartment, either with the beam substantially horizontal, or with the beam disposed at an angle.

The system includes first and second tracks 20, 30 that are disposed upon opposite sides of the cargo compartment.

Each of the first and second tracks 20, 30 has a plurality of apertures 22, 24, 26 (as depicted in the figures with each track preferably having significantly more than three spaced apertures, such as 20 or 30 along the length of the track). Each of the first and second tracks 20, 30 receives a bracket 40 slidable therealong. Each bracket 40 is slidable along the length of the respective track and selectively moved upward and downward with a motor 200, which when operating moves the position of the bracket 40 upon the respective track 20, 30 via a transmission 220. Each bracket 40 may include one or two or more fingers 42 that slide along corresponding track flanges 38 (FIG. 17) of the corresponding track to maintain the connection between the bracket 40 and the track 20, 30 along the length of the track 20, 30 (i.e. when the beam assembly 100 is secured at a selected position corresponding to an aperture in the track 20, 30 and when the beam assembly 100 is stowed near the ceiling of the cargo compartment when not in use).

While each vertical track and bracket 40 is controlled by a dedicated motor 200 via a dedicated transmission 220, for the sake of brevity the construction and operation of a single bracket system will be discussed herein. One of ordinary skill in the art will understand that the corresponding bracket 40 that is connected to the opposite end of the beam assembly 100 from the bracket 40 being discussed in detail herein is constructed and operates in the same manner. In embodiments where the user desires to move the beam 130 to another position but maintain the beam assembly 100 in a horizontal configuration, both brackets 40 that are connected to opposite ends of the same beam assembly 100 will be moved in exact same manner as discussed herein. In other embodiments, where the user may wish to move and/or retain the beam assembly 100 at an angle (i.e. not in a horizontal orientation) the controller 400 (discussed below) will operate the motors corresponding to the opposite ends of the beam assembly 100 in different manners to align the beam assembly 100 at an angle as desired, i.e. to achieve a resting position where the first and second brackets 40 that are associated with opposite first and second tracks 20, 30 rest upon the lower edge of apertures at different heights on the opposite tracks.

The beam assembly 100 may include an elongate beam 130, and two collars 140, which are telescopingly mounted to the beam 130 to allow the length of the beam to selectively extend (when the beam is at an angle) and shorten (when the beam is horizontal). Each collar 140 is connected to a bracket 40, such as with a pinned connection or other types of connections. The collar 140 may be pivotable with respect to the bracket 40.

Figure 1A:
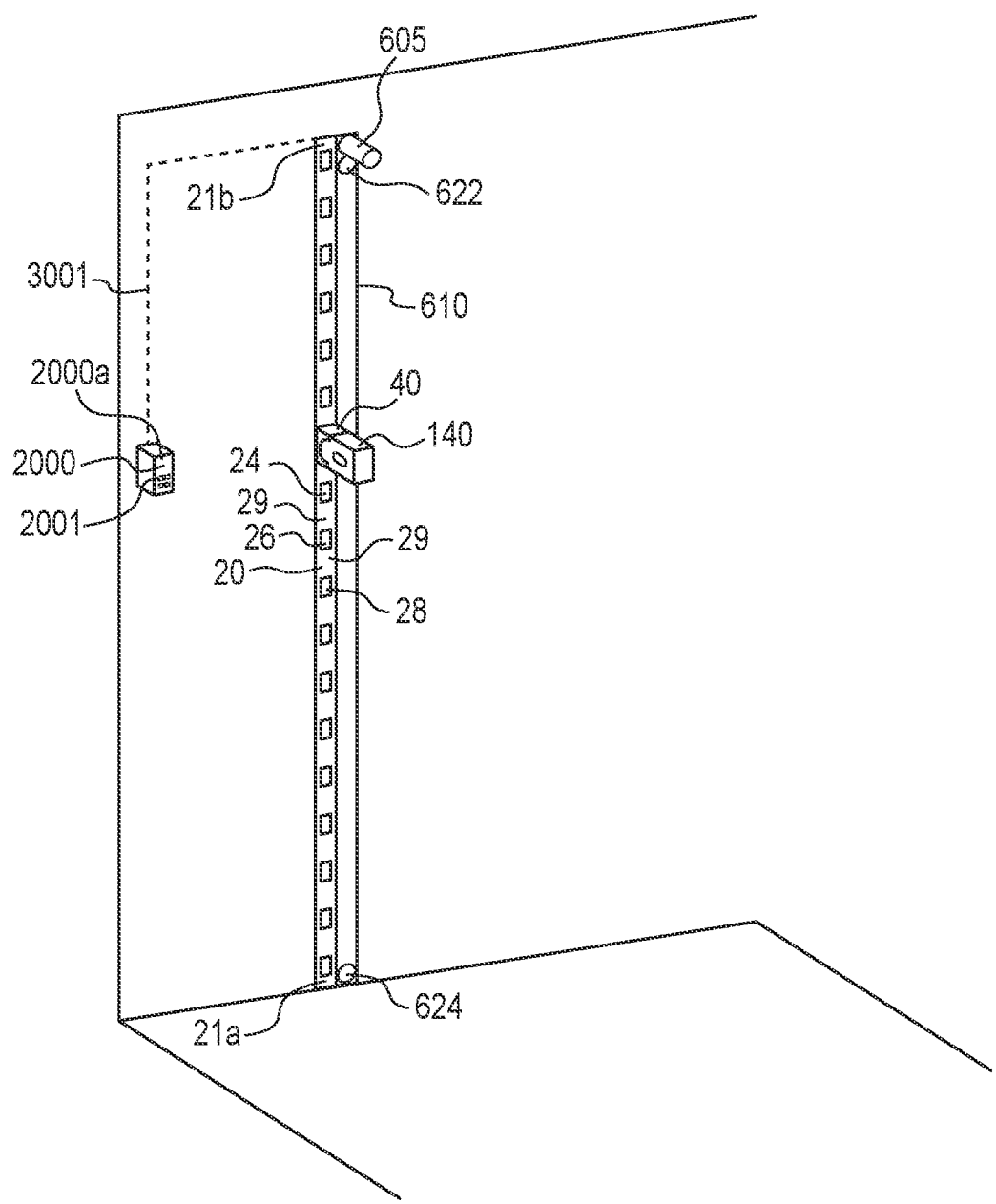
FIG. 1a is a schematic view of one track and a collar assembly (collar, bracket, latch) connected to an aperture in the track, schematically depicting a belt drive disposed between a set of pulleys and fixed with respect to the bracket.
Figure 2:
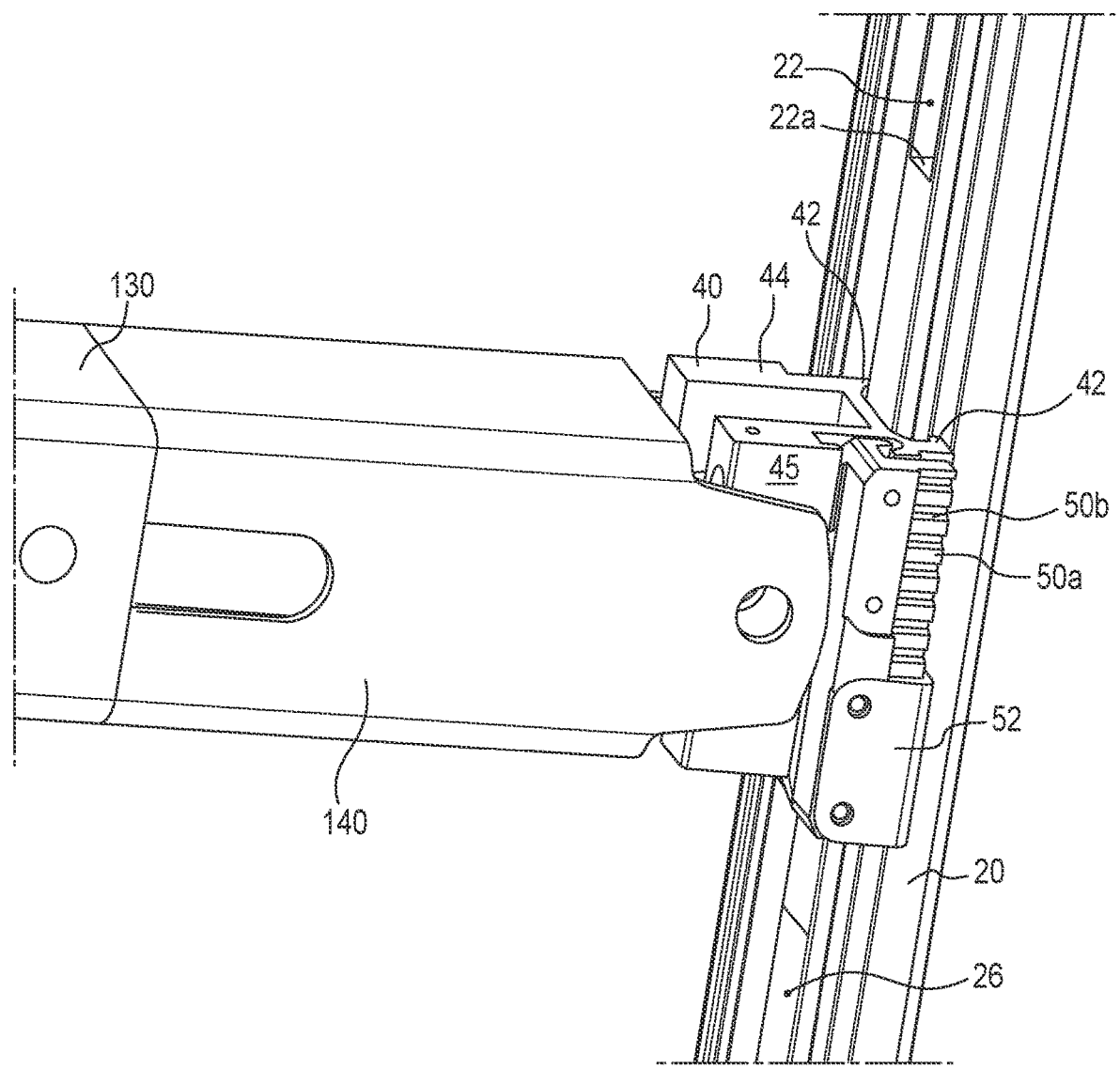
FIG. 2 is schematic view of the bracket upon the track with the belt removed but when installed the teeth of the belt are engageable with the peaks and valleys of the side wall of the bracket.
Figure 17:
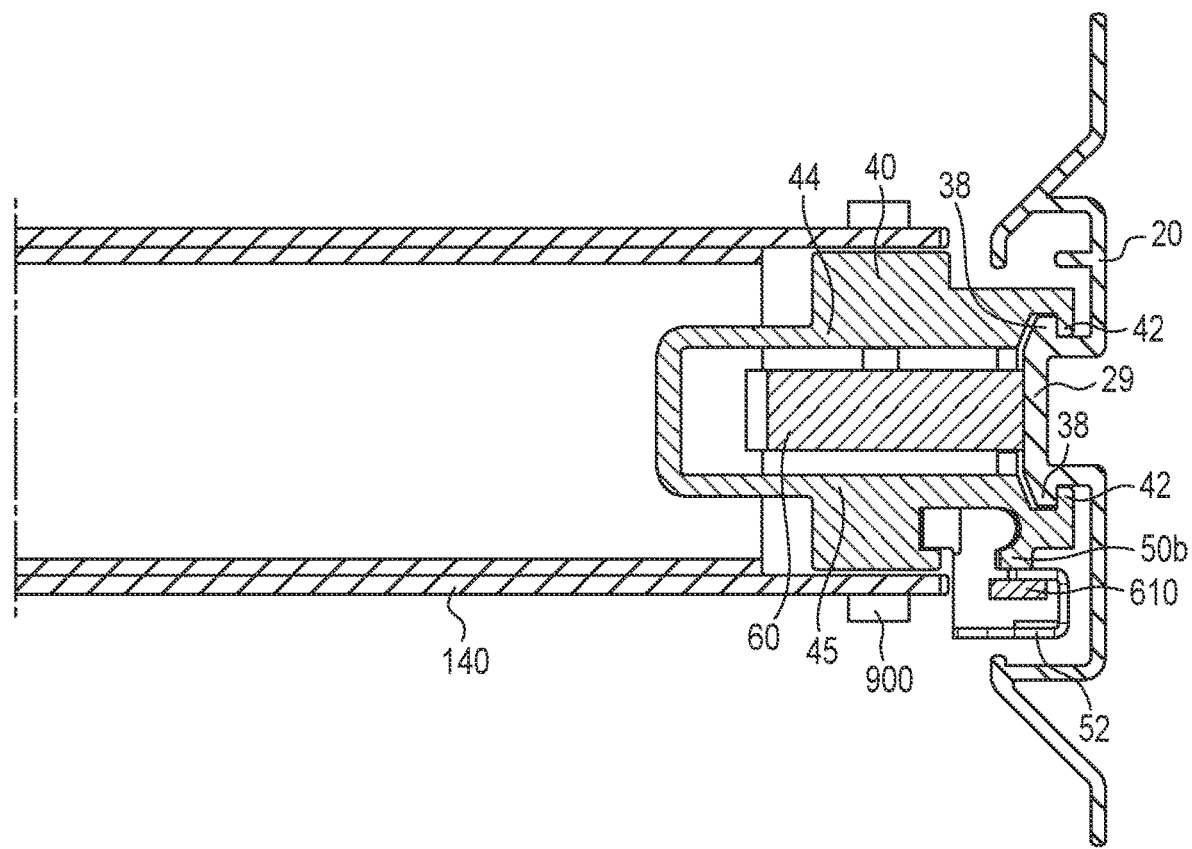
FIG. 17 is a top cross-sectional view depicting the latch in registry with a central portion of the track.

The bracket 40 is best shown in FIGS. 2 and 17. The bracket 40 may include first and second walls 44, 45 that each support fingers 42 that ride within the track 20, 30 that the bracket 40 is slidably mounted to. In some embodiments, one of the first or second walls 44, 45 supports a belt carrier 50 which includes a plurality of peaks 50a and valleys 50b that receive a drive belt thereupon such that teeth of a drive belt are received within the valleys 50b of the belt carrier. Retainer plates 52 (one shown and one removed) can be attached to the wall 44, 45 to prevent relative motion of the belt (shown in FIGS. 1 and 1a) with respect to the wall 44, 45, and therefore force upon the belt causes the bracket 40 to slide upwardly or downwardly upon the respective track 20, 30. As shown in FIG. 1a, the belt 610 may be wrapped around a lower pulley 624 proximate to the lower end 21a of the track and an upper pulley 622 proximate to the upper end 21b of the track, and around the shaft of a motor 605, such that rotation of the shaft of the motor 605 in a first direction causes the belt 610 to pull the bracket 40 upward, and operation of the motor 605 in the opposite direction causes the bracket 40 to be pulled downward along the track 20. In some embodiments, a transmission (such as a second belt, or gears or the like) may be provided between the motor shaft and the upper pulley 622 to adjust the desired speed of the belt 610 with respect to the speed of the motor 605.

Figure 18:
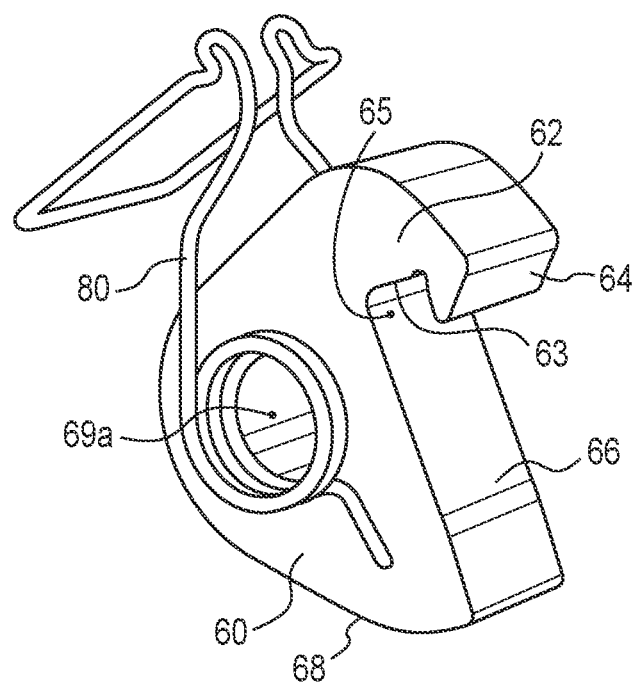
FIG. 18 is a perspective view of the latch and the spring.

The bracket 40 rotationally supports a latch 60, as best shown in FIG. 18, with the latch 60 mounted, in some embodiments, between the walls 44, 45 of the bracket 40. The latch 60 is provided to engage with one of the plurality of apertures (e.g. 22, 24, 26) within the vertical track 20 to allow the weight of the beam assembly 100 (and including the significant load carried by the beam assembly 100 during use) to be supported by the vertical track, rather than the belt 610 (or other type of transmission to cause the bracket 40 to slide along the track 20, 30 supporting the weight of the beam assembly 100 and the load).

The latch 60 includes a finger 62 that extends generally radially from the remaining body of the latch 60 The finger 62 may include a flat 63 that is the surface that rests upon a lower edge (e.g. 22a, 24a, 26a) of an aperture to allow the track to support the latch 60. In some embodiments, the finger further comprises a downwardly extending tip 64 that defines a void 65 below the flat 63, where the lower edge (e.g. 24a) and the track below the lower edge is received.

The latch 60 further includes an outer circumferential edge 61 that defines first and second cam surfaces 66, 68, which depending upon the relative position of the latch 60 with respect to the track, contact the upper edge (e.g. 22b, 24b, 26b) of the track and urge the latch 60 to rotate upon the bracket 40 to properly position the latch 60 to engage the track with further motion of the bracket and latch. The first cam surface 66 may be a flat surface that is below the finger 62 and extends along a wall that forms a portion of the void 65. The second cam surface 68 may be an arcuate surface that is further away from the finger 62 than the first cam surface 66.

Figure 3:
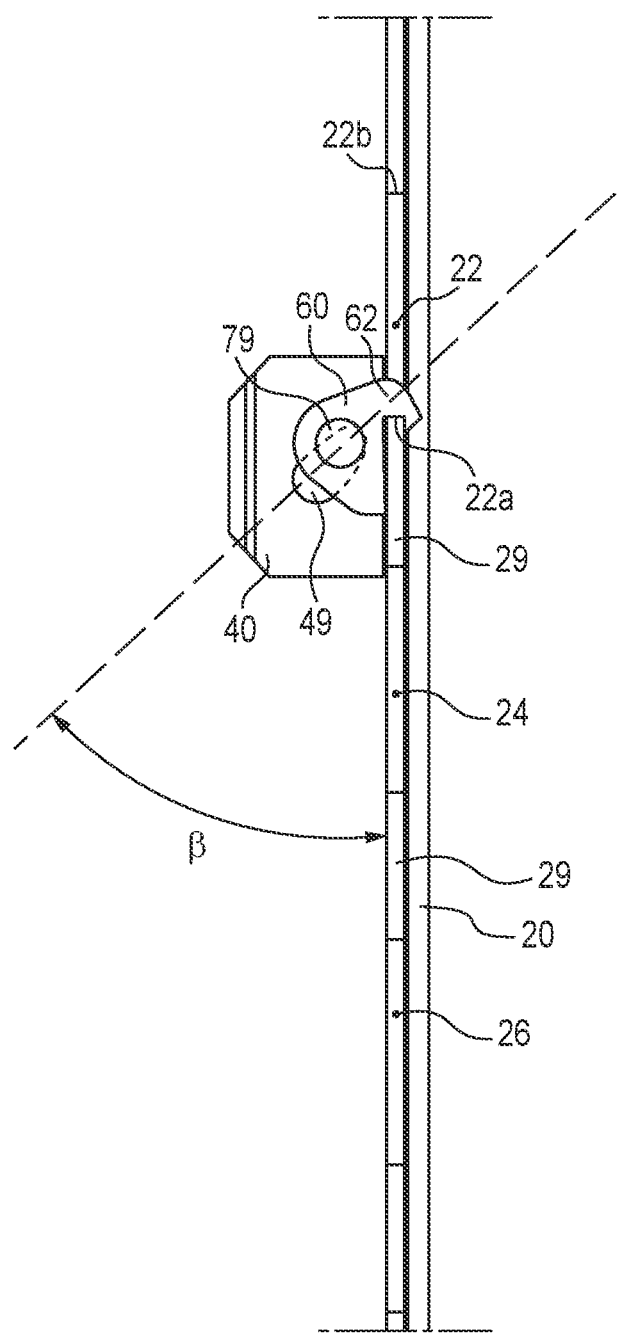
Figure 4:
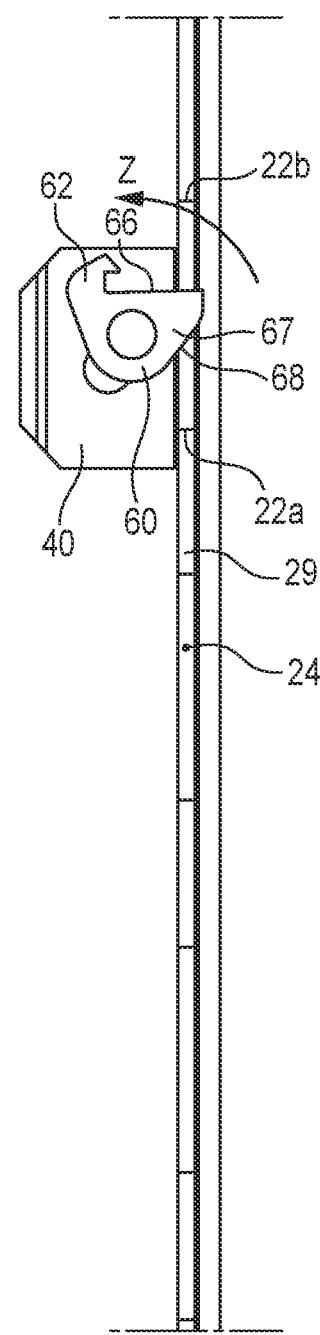

The latch 60 may be biased to rotate with respect to the bracket 40 with a spring 80. In some embodiments, the latch 60 is biased to rotate in a direction away from engagement between the finger 62 and a lower edge (e.g. 22a) of the track when the latch is in position for engagement between the finger 62 and the track. As shown in FIGS. 3 and 4, the spring 80 biases the latch 60 in the counter-clock wise direction Z such that the finger 62 rotates out of contact with the lower edge (22a) once the bracket 40 is raised slightly with respect to the track. As can be understood by one of ordinary skill with a thorough review of this specification and drawings, the weight of the beam assembly 100 (and when load is applied the weight of the load upon the beam assembly) is transferred from the bracket 40, to the latch 60, and ultimately to the track 20, 30 via the finger 62 resting upon the lower edge (e.g. 22a) of the aperture (e.g. 22) in the track 20. The weight of the beam assembly 100 (or more specifically generally one half of the weight of the beam assembly 100 when the beam assembly is horizontal) is high enough to overcome the biasing force of the spring 80 to maintain engagement between the finger 62 and the lower edge of the aperture.

When the beam assembly 100 is unloaded (the system in some embodiments is configured for the beam assemblies 100 to be moved only when the beam assembly 100 is unloaded), the belt 610 pulls the bracket 40 and therefore the latch 60 upward, which causes the finger 62 to disengage from the respective lower edge (24a). Upon the disengagement, the biasing force of the spring 80 interacts with the latch 60 and causes the latch to rotate in the direction Z such that the finger 62 rotates away from and out of the aligned aperture. In some embodiments, the rotation of the latch 60 is such that when biased in the direction Z by the spring, a lower portion 67 extends through the aperture (24) and the first cam surface 66 is directly below the upper edge (24*b*) of the aperture (24).

In some embodiments, the latch 60 is slidable with respect to the bracket 40. In some embodiments (FIG. 3) the walls 44, 45 of the bracket 40 may have a slot 49 and the latch 60 may have a hole 79 for a fastener 900, such as a bolt, while in other embodiments (FIG. 16) the walls 44, 45 of the bracket 40 include holes 49*a* and a slot 69 is formed in the latch 60. The slot 49/69 is sized to allow relative motion of the latch 60 with respect to the bracket 40 (which is fixed to the track 20, 30) to allow the latch 60 to slide away from the track 20, 30 (and against the biasing force of the spring 80) to provide for clearance between the latch and the central portions 29 of the track between adjacent apertures (e.g. between apertures 24 and 26) to allow the latch to slide upwardly and downwardly with respect to the track 20, 30. In some embodiments, the slot 49/69 may be disposed at an acute angle β with respect to an axis through the track, with an angle (when the finger 62 of the latch engages the lower edge (e.g. 22*a*) of the track 20. The acute angle may be about 45 degrees, or an angle within a range of about 30 to 60 degrees. One of ordinary skill will understand with a thorough review of this specification that the value of the acute angle (if necessary at all) will be a function of the relative sizes and positions of the latch, bracket, and track, and one of ordinary skill in the art will be able to design a latch, bracket and track that move as disclosed herein without undue experimentation. In some embodiments, the collar 140 may be pinned to the bracket 40 with the same fastener 500 that is used to pivotably mount the latch 60 to the bracket 40.

As mentioned above, the latch 60 has a second cam surface 68 which is an arcuate surface upon the circumferential surface of the latch 60. The second cam surface 68 may be disposed on an opposite side of the first cam surface 66 from the finger 62. The second cam surface is configured to contact a lower edge (e.g. 24*a*) of an aperture when the bracket 40 and the latch 60 are lowered within an aperture. When the second cam surface 68 contacts the lower edge, the latch 60 is translated away from the track 20, 30 along the slot 49/69 such that the latch 60 clears the central portions 29 of the track 20, 30. Once the latch 60 becomes aligned with the next aperture, a portion of the latch 60 extends into the next aperture. Depending upon the final destination of the bracket 40 and latch 60 (based upon the final position of the beam assembly 100 as desired by the user, through the input device 2000) the bracket 40 and latch 60 may be further lowered to another lower aperture (and when the second cam surface 68 contacts the lower edge (e.g. 26*a*) of the aperture in registration with the latch, such contact again urges the latch 60 away from the track 20, 30 along the slot to provide clearance to travel downwardly past another central portion 29 of the track. If the final destination is an aperture above the current aperture in registration with the latch 60, the first cam surface 66 of the latch 60 contacts the upper edge (e.g. 26*b*) of the aperture, which causes the latch to rotate the second direction (Y, FIG. 8) against the biasing force of the spring 80 and urges the latch 60 away from the track 20, 30 to provide clearance to travel upwardly past a central portion 29 of the track 20, 30.

Figure 19:
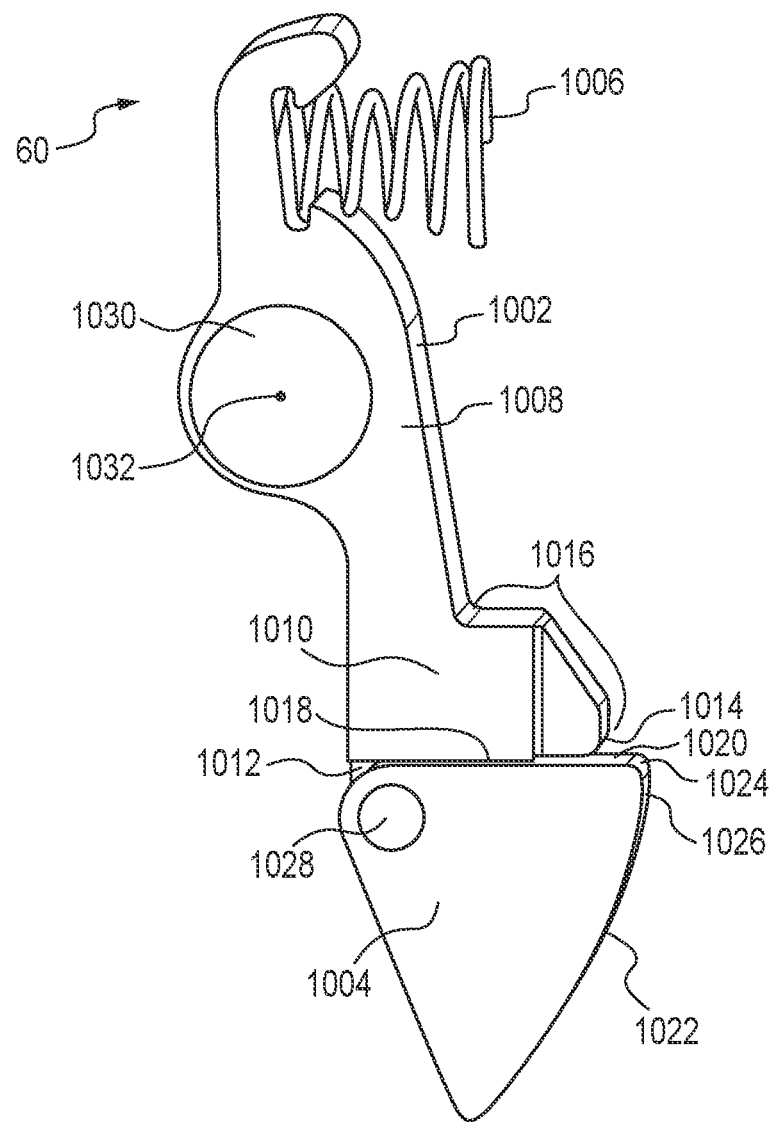
FIG. 19 is a side view of another embodiment of the latch including a rotating portion and a guide in accordance with certain aspects of the present disclosure.
Figure 19A:
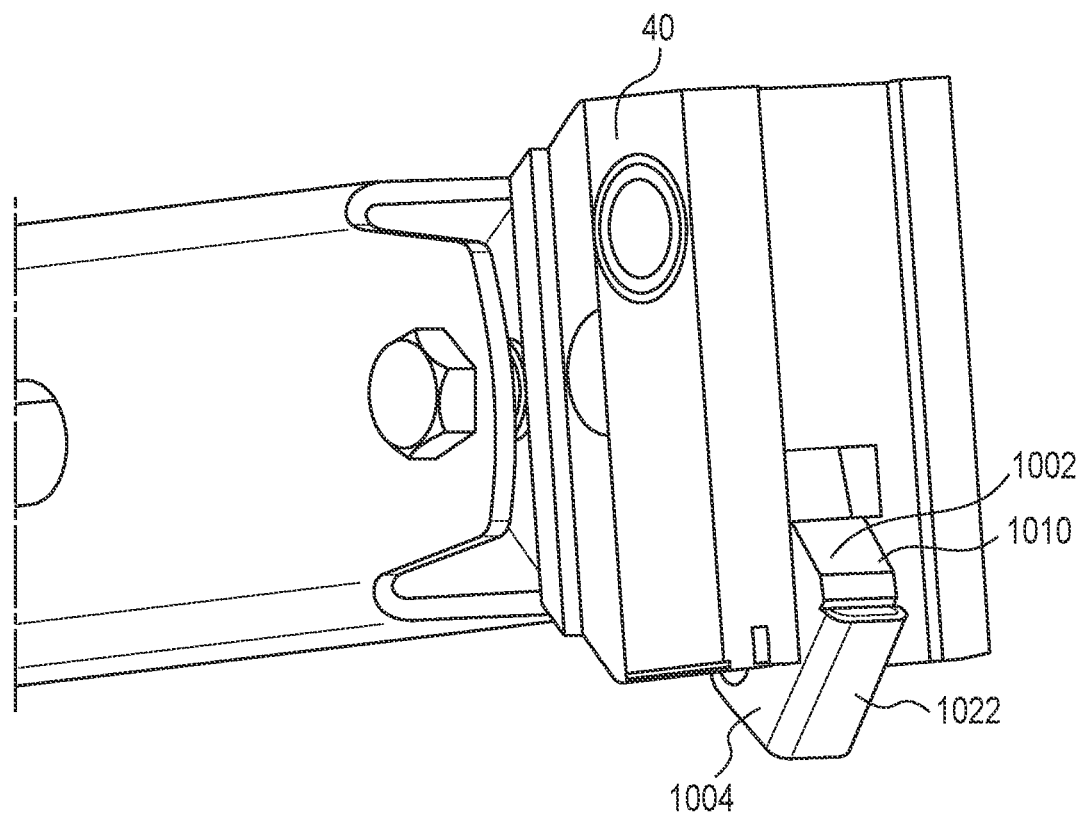
FIG. 19A is a perspective view of the latch of FIG. 19 mounted on a bracket with the guide biased against the rotating portion in accordance with certain aspects of the present disclosure.
Figure 19B:
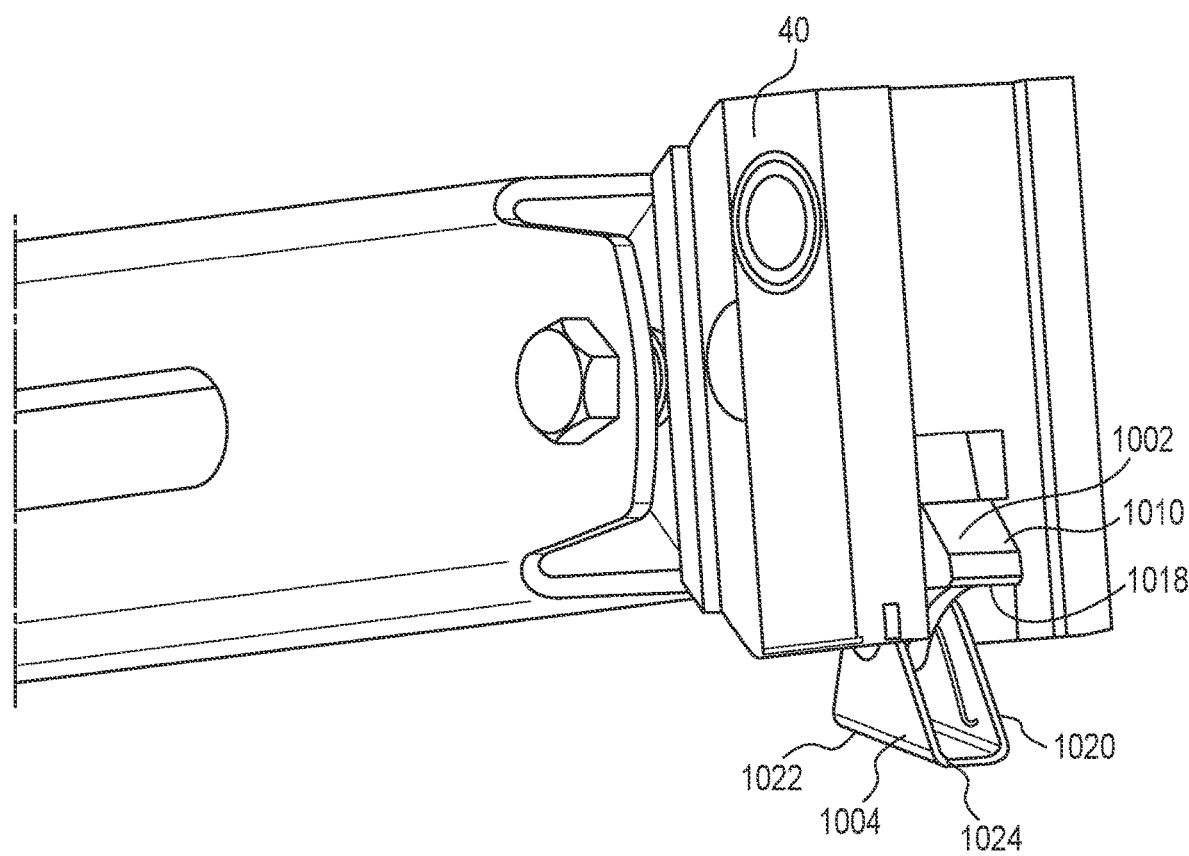
FIG. 19B is a perspective view of the latch of FIG. 19 mounted on a bracket with the guide rotating out of contact with the rotating portion in accordance with certain aspects of the present disclosure.

Referring to FIGS. 19-19B, in some embodiments, the latch 60 may include a rotating portion 1002 and a guide 1004 that is rotatably connected to the rotating portion 1002 of the latch 60. The rotating portion 1002 may be rotatably mounted upon the bracket 40 and biased by a spring 1006, as discussed below. The rotating portion 1002 may include an upper portion 1008, a lower portion 1010 that extends generally perpendicularly from the upper portion 1008, and a bottom portion 1012 located below the lower portion 1010. The upper portion 1008 may include a hole 1030 through which the rotating portion 1002 is mounted on the bracket 40 such that the rotating portion 1002 is rotatable with respect to the bracket 40 about a rotating axis 1032 of the hole 1030 (and about a fastener, such as a pin, that mounts the latch 60 to the bracket 40). The lower portion 1010 may include an outer circumferential edge 1014 that defines third and fourth surfaces 1016 and 1018. Depending upon the relative position of the latch 60 with respect to the track, the third surface 1016 may contact an upper edge (e.g. 22*b*, 24*b*, 26*b*) of an aperture in the track and urge the latch 60 to rotate upon the bracket 40 to properly position the latch 60 to engage the track with further motion of the bracket 40 and latch 60. The fourth surface 1018 may be a flat that rests upon a lower edge (e.g. 22*a*, 24*a*, 26*a*) of an aperture to allow the track to support the rotating portion 1002.

When the lower portion 1010 of the rotating portion 1002 is in registry with an aperture in the track, the biasing force of the spring 1006 may interact with the rotating portion 1002 and cause the rotating portion 1002 to rotate in the direction Z (FIG. 21), such that the lower portion 1010 (e.g. FIG. 28) or the lower portion 1010 together with the guide 1004 (e.g. FIG. 23) rotates towards and into the aligned aperture. When the third surface 1016 contacts an upper edge (e.g. 22*b*, 24*b*, 26*b*) of an aperture in the track, once the bracket 40 is raised slightly with respect to the track, the rotating portion 1002 will be urged to rotate away from and out of the aligned aperture (and against the biasing force of the spring 1006) to provide for clearance between the rotating portion 1002 and the central portions 29 of the track between adjacent apertures (e.g. between apertures 22 and 24) to allow the rotating portion 1002 to slide upwardly and downwardly with respect to the tracks 20 and 30.

The guide 1004 may include an outer circumferential edge 1026 that defines a fifth surface 1020, a sixth surface 1022, and a connecting surface 1024 connecting the fifth and sixth surfaces 1020 and 1022 together (which may be a surface or an edge). The guide 1004 may be rotatably connected to the bottom portion 1012 of the rotating portion 1002 (e.g. pin connection) and biased towards the rotating portion 1002 through a spring 1028. The fifth surface 1020 may be a flat that is biased by the spring 1028 to directly contact the fourth surface 1018 of the rotating portion 1002. The sixth surface 1022 may be an arcuate surface that is further away from the fourth surface 1018 than the fifth surface 1020.

The sixth surface 1022 may be configured to contact a lower edge (e.g. 22*a*) of an aperture (e.g. 22) when the bracket 40 and the latch 60 are lowered within an aperture (e.g. 22). When the sixth surface 1022 contacts the lower edge (e.g. 22*a*), the latch 60 is urged to rotate away from the track such that the latch 60 clears the central portion 29 (e.g. between apertures 22 and 24) of the track (e.g. FIGS. 21-22). Once the latch 60 becomes aligned with the next aperture (e.g. 24), a portion of the latch 60 extends into the next aperture (e.g. 24, FIG. 23). Depending upon the final destination of the bracket 40 and latch 60 (based upon the final position of the beam assembly 100 as desired by the user, through the input device 2000), the bracket 40 and latch 60 may be further lowered to another lower aperture (e.g. 26), and when the sixth surface 1022 contacts the lower edge (e.g. 24*a*) of the aperture (e.g. 24) in registration with the latch 60, such contact again urges the latch 60 away from the track to provide clearance to travel downwardly past another central portion 29 (e.g. between apertures 24 and 26) of the track (e.g. FIGS. 24-25).

Figure 32:
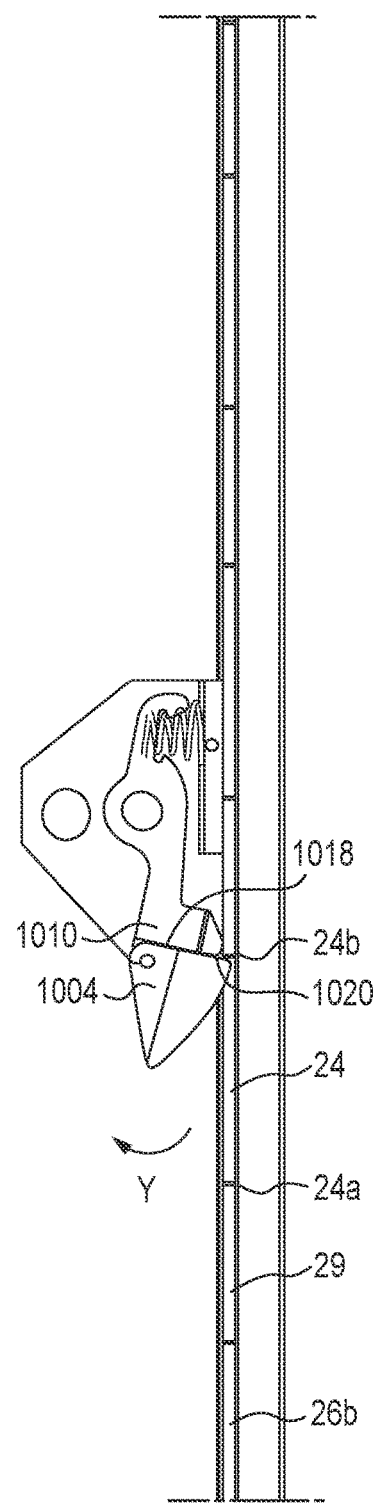

The fifth surface 1020 may be longer than the fourth surface 1018, such that when the fourth and fifth surfaces 1018 and 1020 are contacting each other, a portion of the fifth surface 1020 may contact an upper edge (e.g. 22*b*, 24*b*, 26*b*) of an aperture in the track (e.g. FIG. 32), as the latch 60 has been rotated away from the track due to contact between the third surface 1016 and the upper edge of the aperture. If the final destination is an aperture (e.g. 22) above the current aperture (e.g. 24) in registration with the latch 60, the fifth surface 1020 of the guide 1004 contacts the upper edge (e.g. 24*b*) of the aperture (e.g. 24), which causes the guide 1004 to rotate in the direction Y (e.g. FIG. 33) and out of contact with the fourth surface 1018 (against the biasing force of the spring 1028) once the bracket 40 is raised slightly with respect to the track, so as to urge the guide 1004 away from the track to provide clearance to travel upwardly past a central portion 29 (e.g. between apertures 22 and 24) of the track (e.g. FIGS. 32-33).

When the bracket 40 is secured to the track through a desired aperture (e.g. 22) in the track, the lower portion 1010 of the rotating portion 1002 rests upon the lower edge (e.g., 22*a*) of the aperture (e.g. 22), and the connecting surface 1024 of the guide 1004 is biased against a central portion 29 below the aperture (e.g. 22) with the fifth surface 1020 of the guide 1004 extending at an acute angle α with respect to a longitudinal axis through the track (e.g. FIG. 20) and in some embodiments, the connecting surface 1024 contacting the central portion 29 of the track. As can be understood by one of ordinary skill with a thorough review of this specification and drawings, the weight of the beam assembly 100 (and when load is applied the weight of the load upon the beam assembly) is transferred from the bracket 40, to the latch 60, and ultimately to the tracks 20 and 30 via a triangular supporting structure formed by the lower portion 1010 of the rotating portion 1002 resting upon the lower edge (e.g. 22*a*) of the aperture (e.g. 22) in the track 20, the guide 1004, and the central portion 29 of the track between the aperture (e.g. 22) and the aperture directly below (e.g. 24, FIG. 20). The triangular supporting structure provides a strong supporting force to the beam assembly 100, such that a strong loading strength can be achieved. The weight of the beam assembly 100 (or more specifically generally one half of the weight of the beam assembly 100 when the beam assembly is horizontal) is high enough to overcome the biasing force of springs 1006 and 1028 to maintain engagement between the lower portion 1010 of the rotating portion 1002 and the lower edge (e.g. 22*a*) of the aperture (e.g. 22) and the engagement between the connecting surface 1024 and the central portion 29 of the track between the aperture (e.g. 22) and the aperture directly below (e.g. 24).

The configuration of this embodiment of the latch 60 provides the ability to move the contacting point between the latch 60 and the track to a position lower than the rotating axis 1032 of the rotating portion 1002, which creates a compressive load path between the latch 60 and the track such that tensile loading may be reduced. In addition, this embodiment of the latch 60 may be incorporated into an automated decking system without the use of complicated electromechanical systems to release the latch 60 for moving the beam upwardly or downwardly. As such, this embodiment of the latch 60 may provide substantial load-bearing properties, which improves the loading strength and increases the beam storage height (e.g. the beam can be stored higher toward the ceiling in a trailer thereby increasing clearance for cargo or forklift).

The system 10 is controlled by an input device 2000, which receives instructions from the user regarding the desired height of the beam assembly 100, and in some embodiments, the desired heights of the opposite ends of the beam assembly 100. In situations where a cargo compartment, for example, has multiple beam assemblies 100, the input device 2000 may control each beam assembly separately and may also control all beam assemblies together as a single unit. In some embodiments, the input device 2000 may include macros that can be selected by a user, such as to be programmed a certain group of beam assemblies 100 together to a certain height to receive certain cargo loads above, or below the certain beam assemblies. The input device 2000 may be a control box with inputs for all of the beam assemblies, which is positioned proximate to the open end of the cargo compartment such that a driver of a forklift could operate the input device in conjunction with loading or unloading a cargo compartment. In other embodiments, the input device may be a smartphone, tablet or computer, and communicate with the control system via Bluetooth, Wi-Fi, the internet, or other mediums known in the art. Further, the control system 2000*a* may communicate with each motor 605 in the system via a wired connection, or via Bluetooth, Wi-Fi, or other signal transmission processes known in the art.

In some embodiments, the input device 2000, the control system 2000*a*, and the motors 605 may be operated by batteries, such as rechargeable batteries. In other embodiments, the system may be selectively powered by conventional AC power, which may charge the batteries and/or provide power to the system.

Further, the control system (2000*a*, shown schematically with respect to the input device 2000) receives an input that is representative of the vertical position of the bracket 40 with respect to the track 20. The position input in some embodiments is with respect to the position of the apertures e.g. 22, 24, 26 along the track. The control system directs the operation of the motor in order to raise or lower the bracket 40 with respect to the track 20 and specifically with respect to the aperture that is desired for connection based upon the input into the input device 2000.

Turning now to FIGS. 3-15 and 20-35, methods of adjusting a decking system from one vertical position upon first and second vertical tracks is provided. The method includes the steps of controlling the vertical position of first and second brackets 40 that are connected to opposite first and second ends of a decking beam assembly 100, and which slide upwardly and downwardly along respective tracks 20, 30, based upon the operation of motors 605 that are connected to each bracket through a transmission, such as a drive belt 610 via a series of pulleys 622, 624, a lead screw drive, a cable drive, hydraulic cylinders, or pneumatic cylinders or the like. In the methods, operation of the motor 605 in a first direction urges the bracket 40 (and therefore the end of the beam assembly 100 attached to the bracket 40) upwardly, and operation of the motor in the opposite second direction urges the bracket 40 (and end of the beam) downwardly along the track. With motion of the bracket 40 along the track, a latch 60 that is pivotably and in some embodiments (FIGS. 3-15) slidably mounted with respect to the bracket 40 rotates and translates as the latch is in sliding registration with apertures disposed along the track and the central portion 29 disposed between adjacent apertures.

The methods include methods of lowering the end of the beam assembly 100, by lowering the bracket 40 slidably mounted to the first track 20, and is shown with reference to FIGS. 3-11) and (20-29). For the sake of brevity in this description, the methods described below will be a method of moving a vertical position of a bracket 40 upon a track 20, 30. One of ordinary skill in the art should understand that this method will also result in the end of the beam assembly 100 attached to the bracket 40 moving with the bracket. The methods discussed below also explicitly refer to only moving one bracket along one track, but one of ordinary skill should understand that the method also may include the steps of moving the bracket fixed to the opposite end of the beam assembly along its track in the same manner (to maintain the beam assembly 100 in a horizontal orientation) or could entail moving the bracket fixed to the opposite end of the beam assembly in a differing manner (to result in the beam assembly 100 being in an angled orientation, such as may be desired for laterally shoring loads within a cargo compartment).

In some embodiments, as shown in FIGS. 3-15, the method of lowering an end of the beam assembly 100 begins with an initial condition with the finger 62 of the latch engaging the lower edge 22a of a first aperture 22 and ends with the finger 62 of the latch 60 engaging an aperture 24 directly below the aperture 22 (FIG. 3). One of ordinary skill will understand that the same method can be used for lowering the bracket 40 to other apertures in the track that are lower than aperture 24 using the same steps as described herein.

In a first step depicted in FIG. 4, the bracket 40 is raised vertically such that the finger 62 no longer contacts the lower edge 22a of the aperture 22, and with sufficient vertical motion, the body of the latch 60 clears the lower edge 22a and is free to rotate in the first direction Z due to the biasing force of the spring 80. In this position, a portion of the latch 60 including the second cam surface 68 extends through the aperture 22 and the finger 62 is outside of the aperture 22.

Next, as shown in FIG. 5, the bracket 40 is lowered until the second cam surface 68 contacts the lower edge 22a of the aperture 22, which pushes the latch 60 away from the track 20 (via the slot 49 in the bracket 40, or the slot 69 in the latch 60—see arrow T) to allow the bracket 40 and latch 60 to slide downwardly along the central portion 29 of the track between aperture 22 and aperture 24 (FIG. 6), which is adjacent to and below aperture 22 (and in this method is where the bracket will be ultimately fixed to).

The bracket 40 continues to slide past aperture 24. When the latch is in registry with aperture 24, a portion of the latch, including the second cam surface 68 extends within the aperture (with the finger 62 extending outside of the aperture) (similar to the orientation depicted in FIG. 4 with respect to the aperture 22) until the latch reaches the bottom edge 24a, which slides the latch 60 away from the track 20 to allow the bracket 40 and latch 60 to slide past the central portion 29 between apertures 24 and adjacent lower aperture 26 (similar to the orientations depicted in FIGS. 5 and 6).

Figure 7:
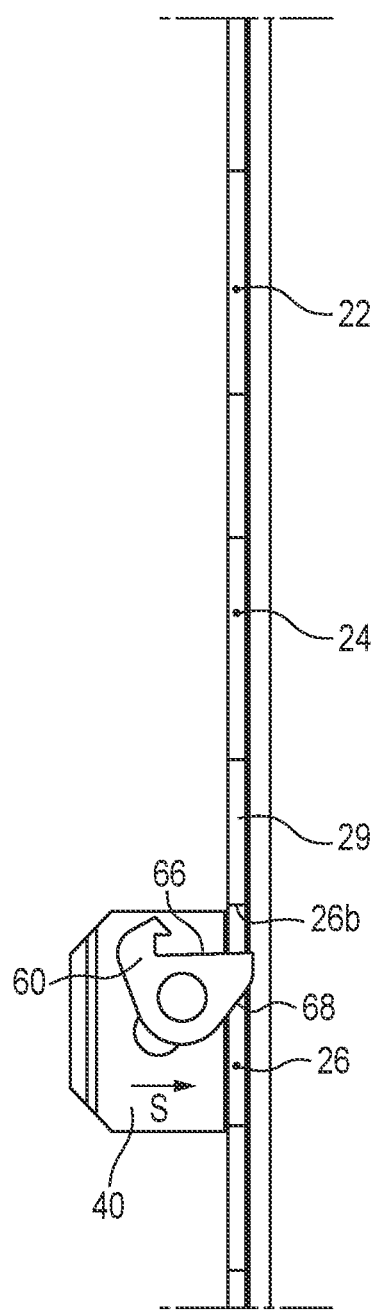
Figure 8:
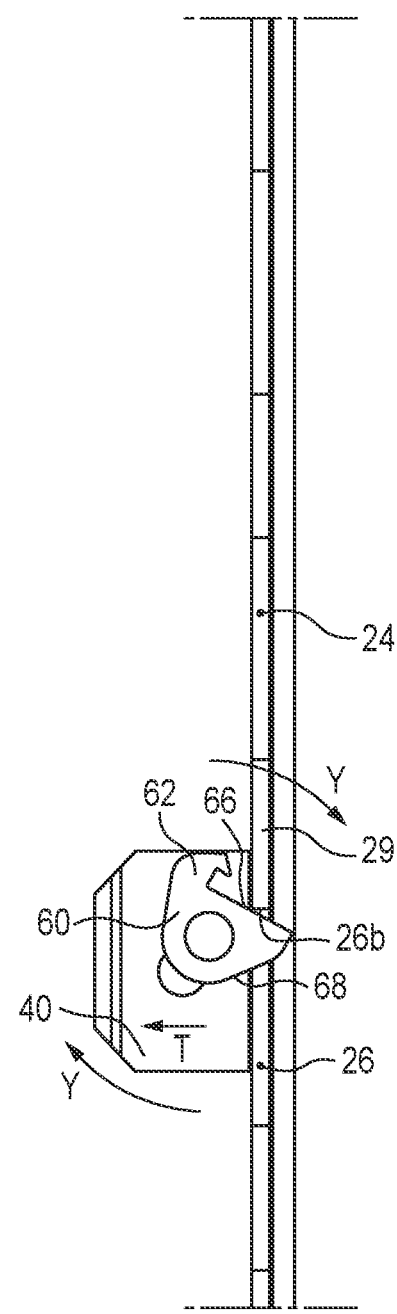

When the bracket 40 reaches aperture 26, a portion of the latch 60, when in registry with the aperture 26, as discussed above, extends through aperture 26, including the first cam surface 66 and the second cam surface 68, with the finger 62 outside of the aperture, as depicted in FIG. 7.

Figure 9:
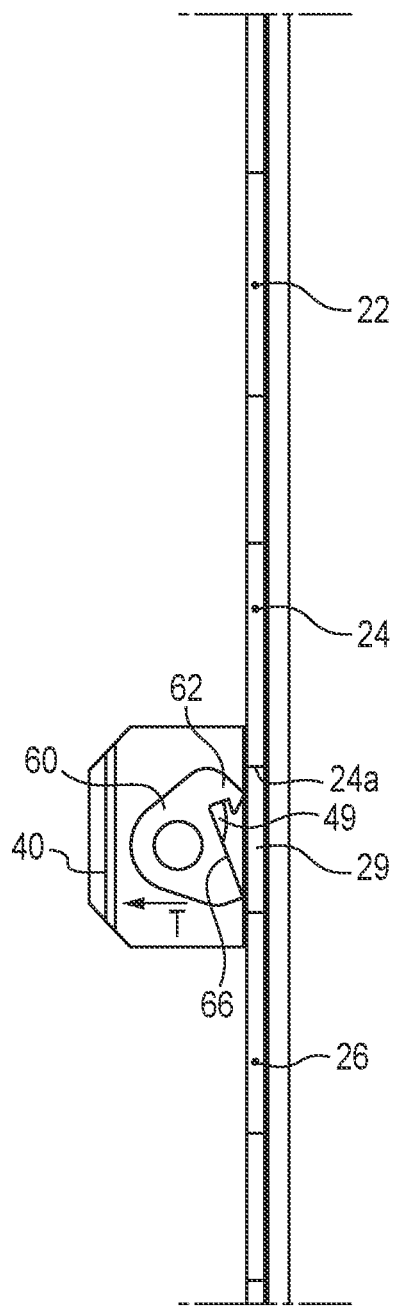
Figure 10:
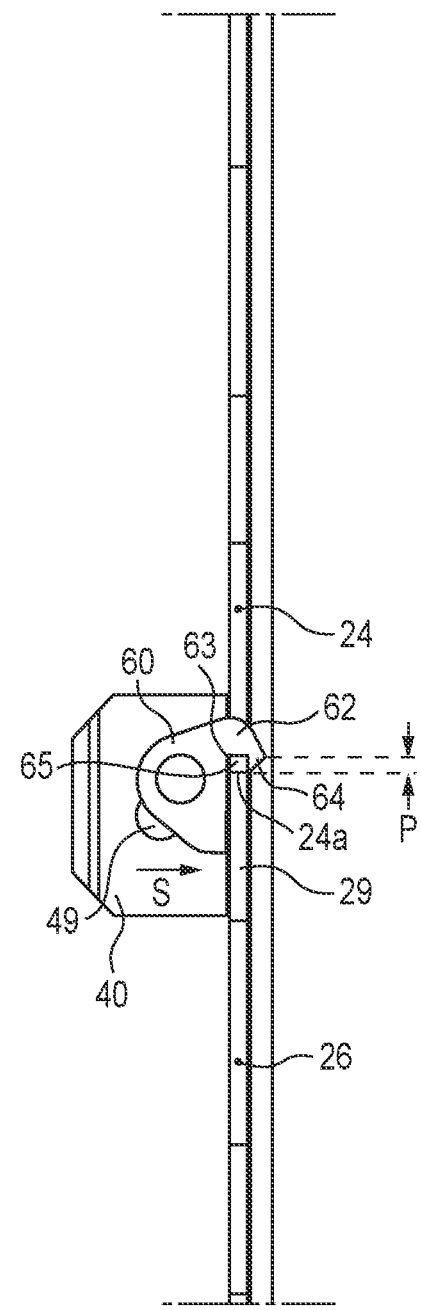
Figure 11:
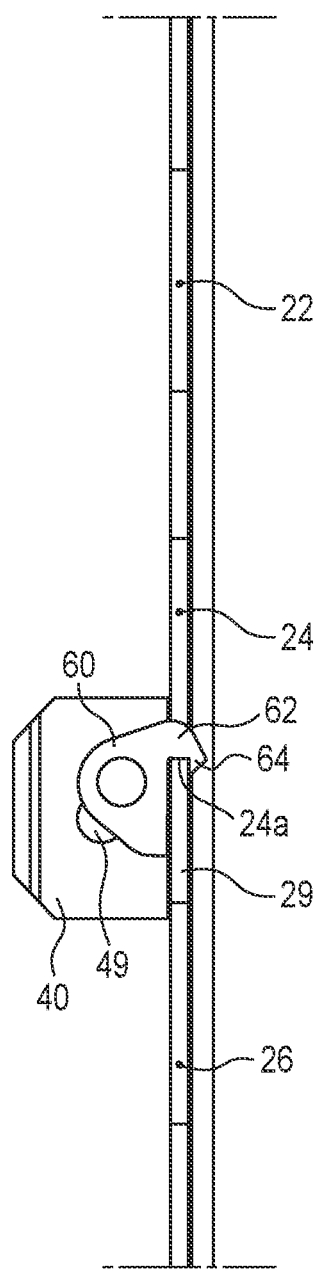

Next, the bracket 40 is raised along the track 20 until the first cam surface 66 contacts the upper edge 26b of the aperture 26, which causes the latch 60 to rotate in the second direction Y (FIG. 8) and also slide away from the track 20 (direction T) such that the latch 60 is free to slide vertically along the central portion 29 of the track toward the aperture 24 (FIG. 9). The bracket is slid until the finger 62 is in registry with the aperture 24 and above the lower edge 24a, and the finger 62 is then urged through the aperture due to the biasing force of the spring 80 (FIG. 10). In embodiments where the finger includes an extending tip 64, the bracket is lowered slightly from the vertical position (distance P) where the finger 62 as extended into the aperture 24 so that the flat 63 of the finger 62 rests upon the lower edge 24a of the aperture 24 (FIG. 11). In this orientation, the weight of the beam assembly 100 is carried by the track 20 via the latch and the bracket 40 and the beam assembly 100 can be loaded as desired.

A method of raising the bracket 40 (and end of the beam assembly 100) the end of the beam assembly 100, by raising the bracket 40 slidably mounted to the first track 20 is discussed below, and is shown with reference to FIGS. 11-15. The method describes raising the bracket 40 to an aperture directly above the aperture that the bracket is aligned with in the initial condition of the method, but one of ordinary skill will understand that the method is equally applicable to raising the bracket across multiple apertures.

Figure 12:
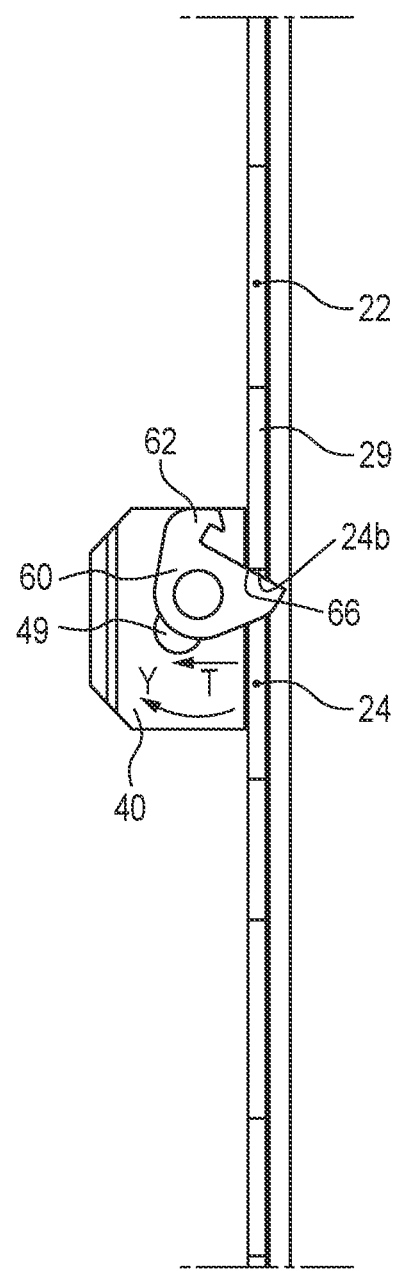
FIGS. 12-15 are side cross-sectional images of the bracket and latch with respect to the track as the alignment of the bracket is raised from initial alignment with aperture 24 to final alignment with aperture 22. The images are depicted with the spring removed for simplicity, but the spring when provided bears against the bracket to urge the latch to rotate and slide with respect to the bracket and the track.

As depicted in FIG. 11, the finger 62 of the latch 60 rests upon the lower edge 24a of the aperture 24 and an input is received to raise the bracket 40 to the aperture 22 above aperture 24. The bracket 40 is raised until the latch 60 is clear of the lower edge 24a, and the spring 80 urges the latch to rotate in the direction Z until the first and second cam surfaces 66, 68 extend through the aperture 24 as depicted in FIG. 12.

Figure 13:
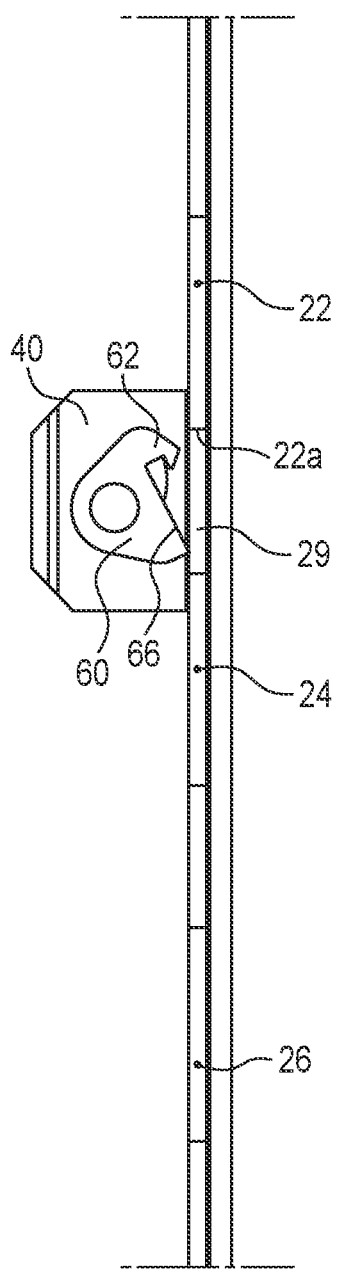
Figure 14:
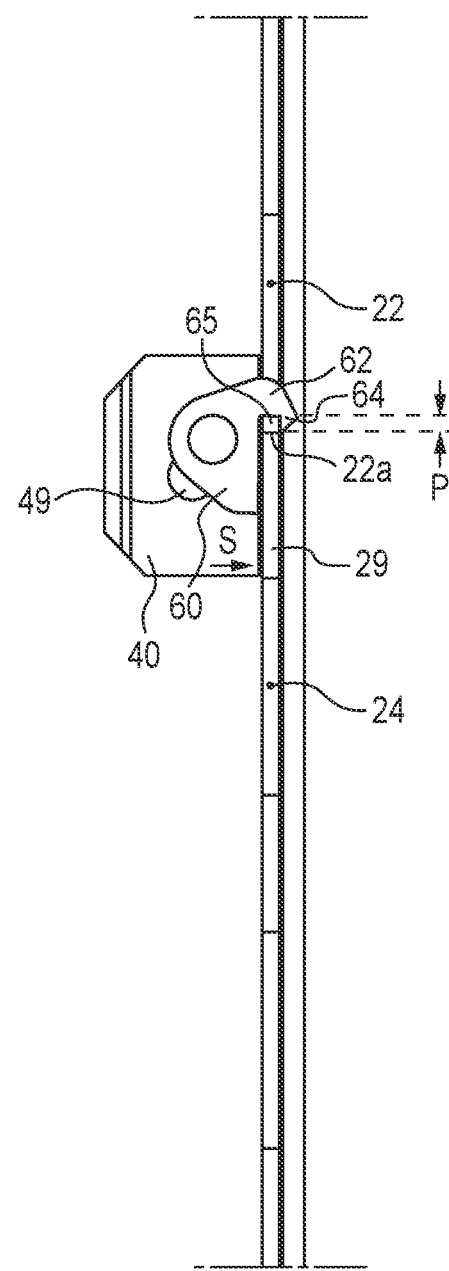
Figure 15:
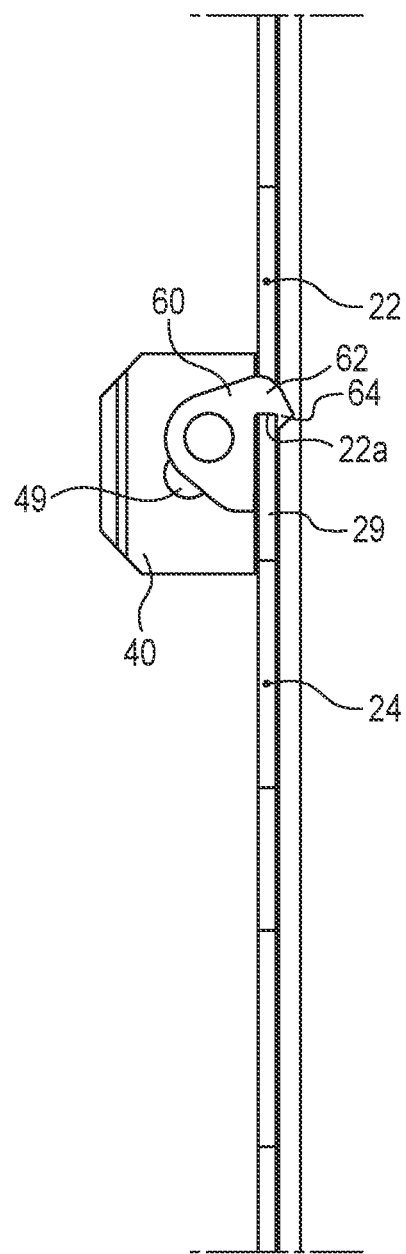
Figure 16:
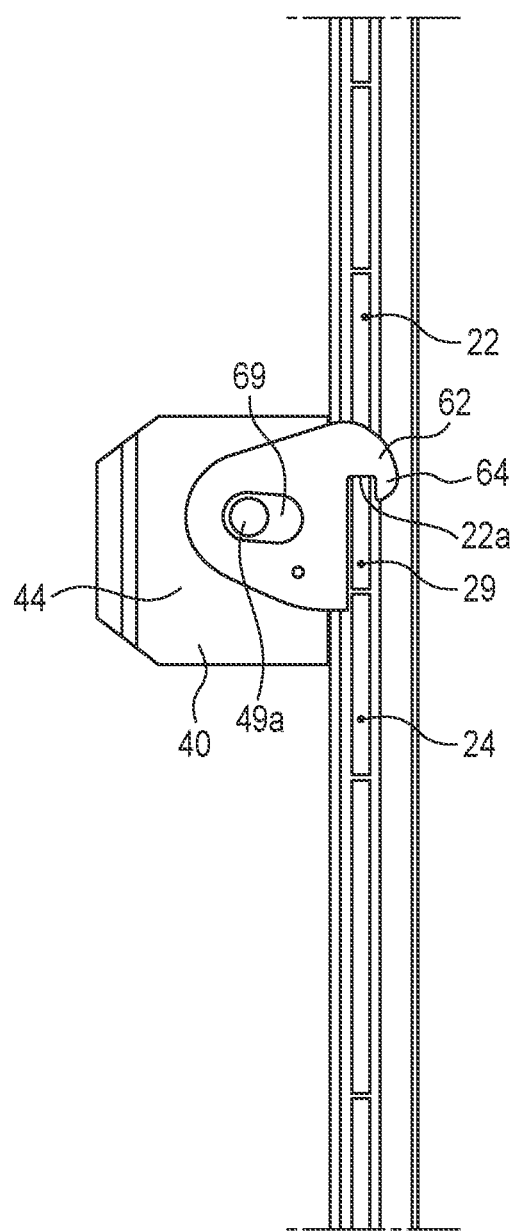
FIG. 16 is the image of FIG. 15, depicting a slot disposed in the latch and a hole in the wall of the bracket to allow the latch to slide with respect to the bracket and the track.

As the bracket 40 continues to raise, the first cam surface 66 contacts the upper edge 24b of the aperture 24 (FIG. 12), which causes the latch 60 to rotate in the second direction Y and also slide away from the track 20 (direction T) such that the latch 60 is free to slide vertically along the central portion 29 of the track toward the aperture 24 (FIG. 13). The bracket is slid upwardly along the track until the finger 62 is in registry with the aperture 22 and above the lower edge 22a, and the finger 62 is then urged through the aperture due to the biasing force of the spring 80 (FIG. 14). In embodiments where the finger includes an extending tip 64, the bracket is lowered slightly from the vertical position where the finger 62 as extended into the aperture 22 (distance P) so that the flat 63 of the finger 62 rests upon the lower edge 22a of the aperture 22 (FIG. 15). In this orientation, the weight of the beam assembly 100 is carried by the track 20 via the latch and the bracket 40 and the beam assembly 100 can be loaded as desired.

Turning now to FIGS. 20-35, another embodiment of the method of adjusting a decking system from one vertical position upon the vertical tracks 20 and 30 is provided. The method includes a method of lowering the end of the beam assembly 100, by lowering the bracket 40 slidably mounted to the track 20, and is shown with reference to FIGS. 20-29.

Figure 29:
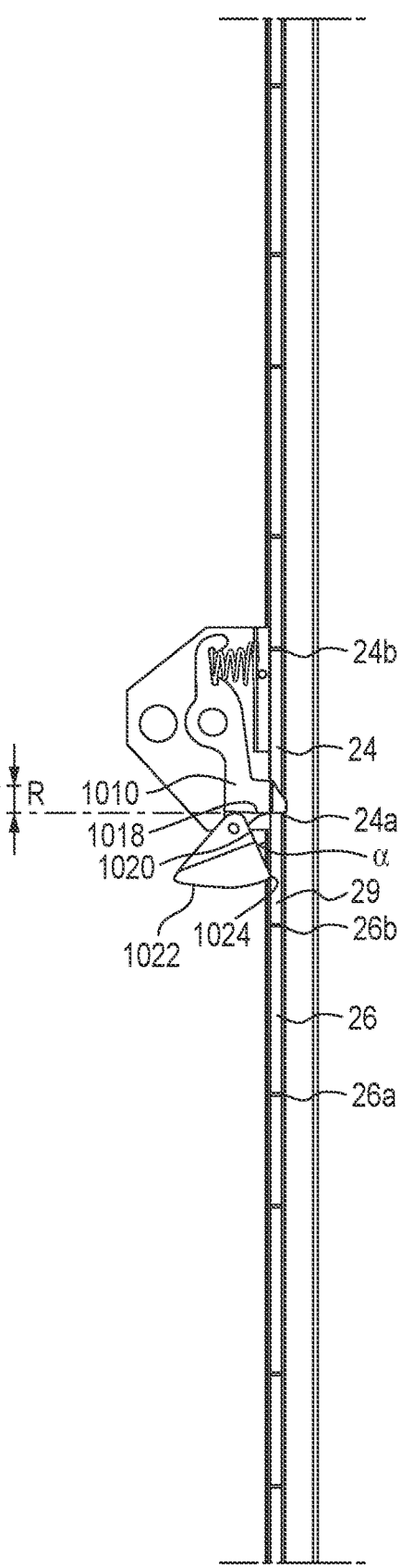

The method of lowering an end of the beam assembly 100 begins with an initial condition with the rotating portion 1002 engaging the lower edge 22a of the aperture 22 (FIG. 20) and ends with the rotating portion 1002 engaging the aperture 24 directly below the aperture 22 (FIG. 29). One of ordinary skill will understand that the same method can be used for lowering the bracket 40 to other apertures in the track 20 that are lower than aperture 24 using the same steps as described herein.

Figure 20:
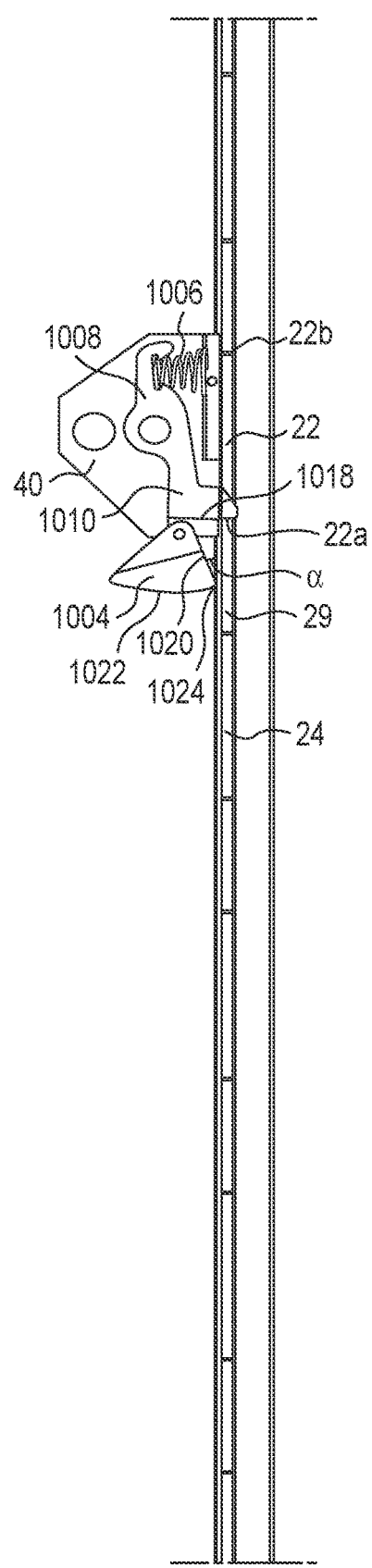
FIGS. 20-29 are illustrations showing side cross-sectional views of the bracket and the latch of FIG. 19 with respect to the track as the alignment of the bracket is lowered from initial alignment with the aperture 22 to final alignment with the aperture 24 in accordance with certain aspects of the present disclosure.

As shown in FIG. 20, when the rotating portion 1002 is engaging the lower edge 22a of the aperture 22, the lower portion 1010 of the rotating portion 1002 rests upon the lower edge 22a of the aperture 22, and the connecting surface 1024 of the guide 1004 is biased against a central portion 29 directly below the aperture 22 with the fifth surface 1020 of the guide 1004 extending at an acute angle α with respect to a longitudinal axis through the track 20.

Figure 21:
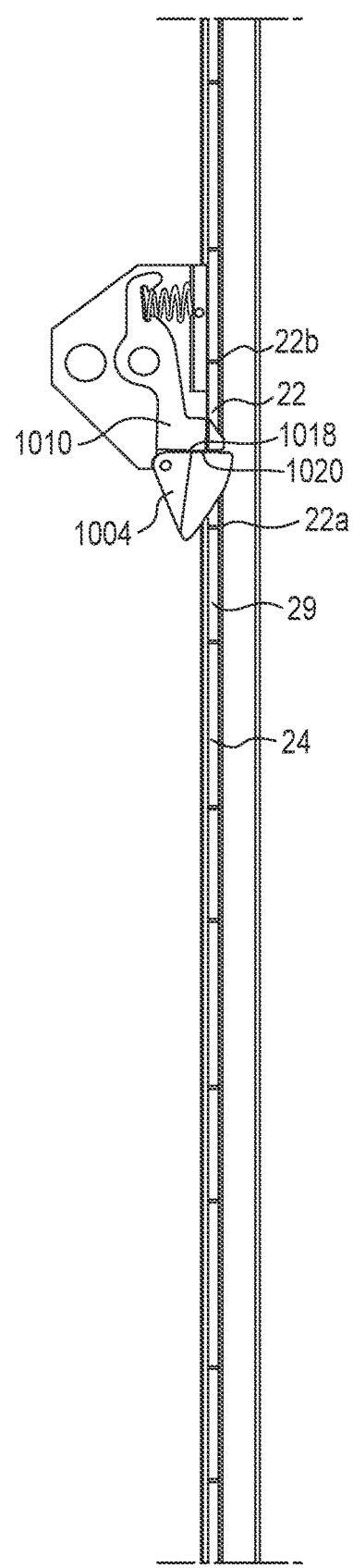

In a first step depicted in FIG. 21, the bracket 40 is raised vertically such that the lower portion 1010 of the rotating portion 1002 no longer contacts the lower edge 22a of the aperture 22. With sufficient vertical motion (e.g. 0.5-1 inch), the connecting surface 1024 clears the central portion 29 directly below the aperture 22, such that the guide 1004 rotates in the direction Z to contact the fourth surface 1018 of the rotating portion 1002 due to the biasing force of the spring 1028. In this position, a portion of the rotating portion 1002 and the guide 1004 extend through the aperture 22 with the sixth surface 1022 contacts the lower edge 22a of the aperture 22.

Figure 22:
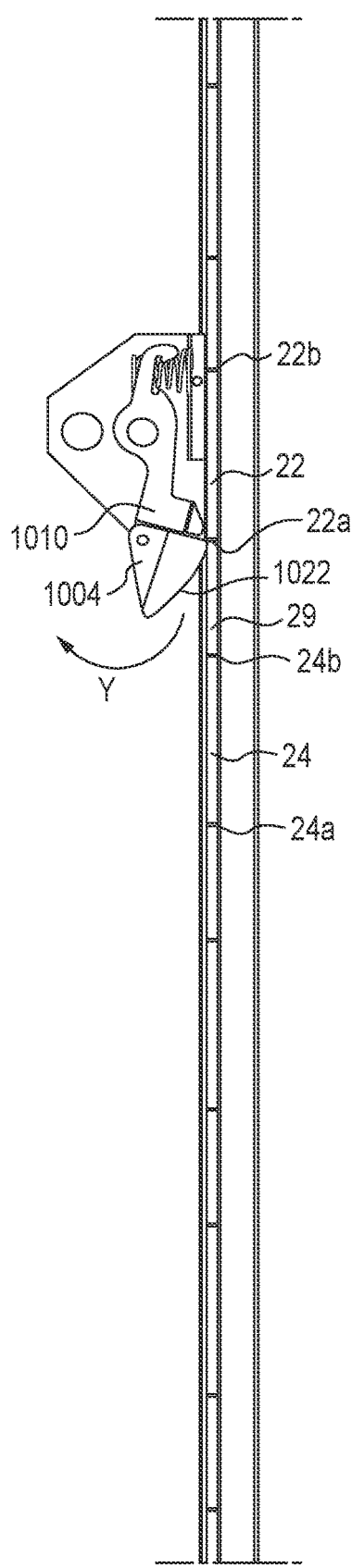

Next, as shown in FIG. 22, the bracket 40 is lowered, which allows the contact between the sixth surface 1022 and the lower edge 22a of the aperture 22 to urge the latch 60 to rotate in the direction Y to allow the bracket 40 and latch 60 to slide downwardly along the central portion 29 of the track 20 between the apertures 22 and 24. The aperture 24 is adjacent to and below the aperture 22, and in this method is where the bracket 40 will be ultimately fixed to.

Figure 23:
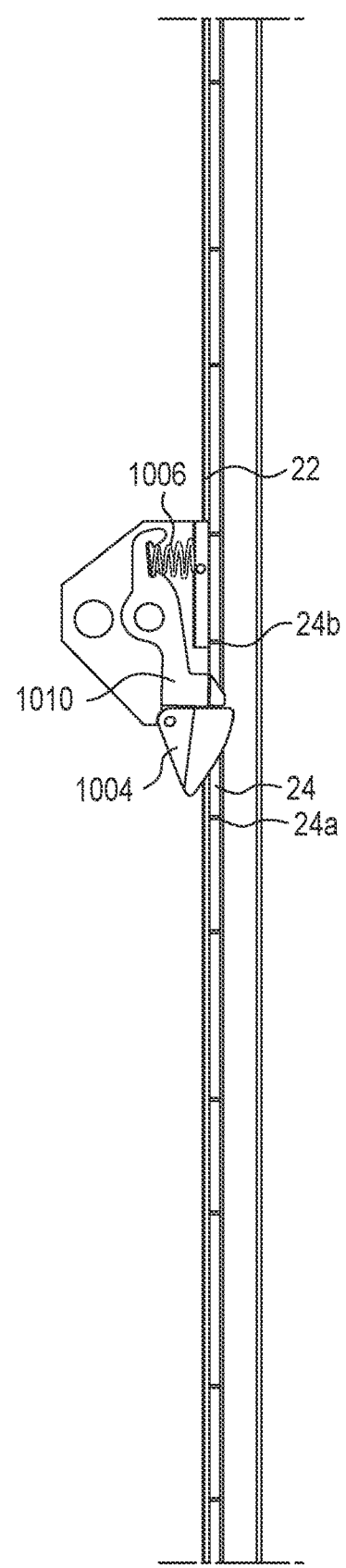
Figure 24:
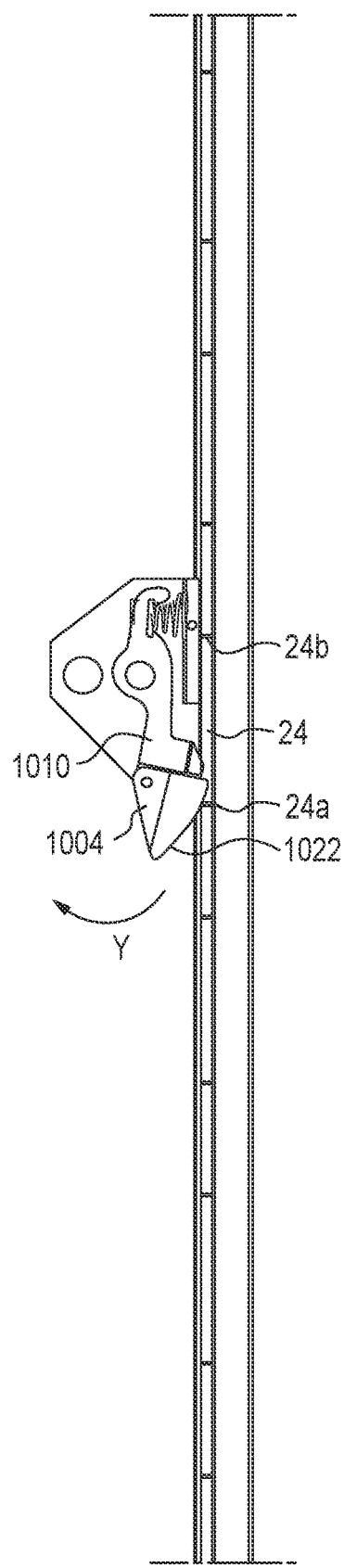
Figure 25:
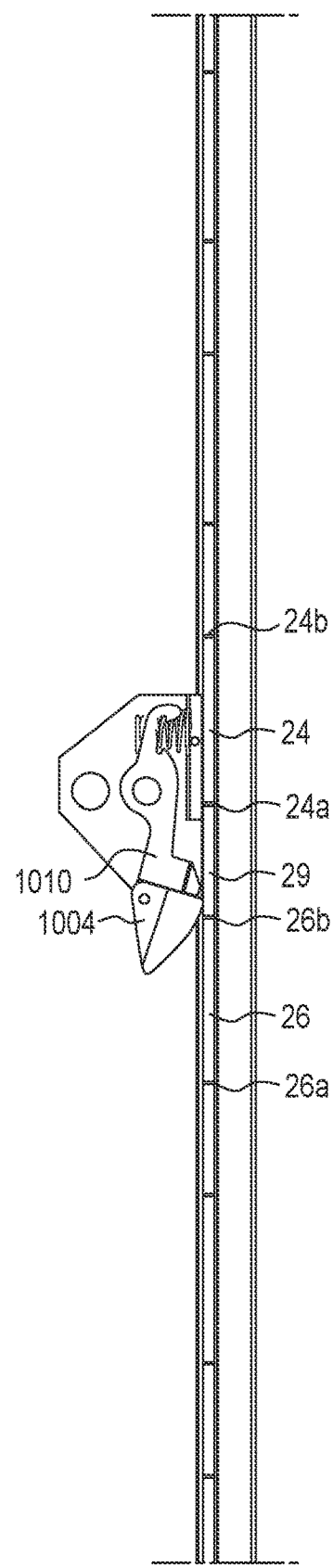

The bracket 40 continues to slide past aperture 24 (FIGS. 23-25). When the rotating portion 1002 is in registry with aperture 24, a portion of the rotating portion 1002 and guide 1004 extend within the aperture 24 (FIG. 23), with the upper portion 1008 outside of the aperture 24, and the latch 60 is free to rotate in the direction Z until the sixth surface 1022 reaches the lower edge 24a. Then the bracket 40 is further lowered, which rotates the latch 60 in the direction Y to allow the bracket 40 and latch 60 to slide past the central portion 29 between the aperture 24 and adjacent lower aperture 26 (FIGS. 24-25).

Figure 26:
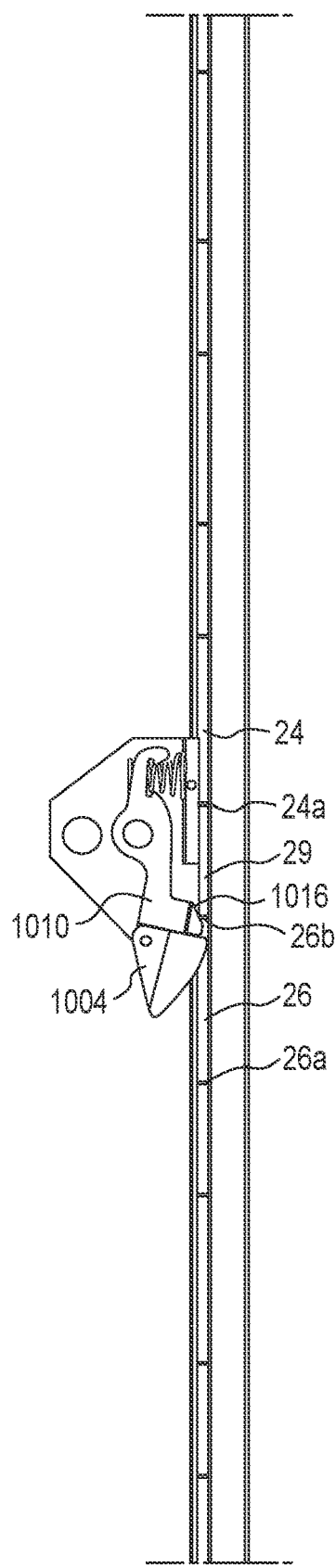

When the bracket 40 reaches the aperture 26, a portion of the guide 1004 extends through the aperture 26, with the third surface 1016 contacting the upper edge 26b of the aperture 26 and the upper portion 1008 outside of the aperture 26, as depicted in FIG. 26.

Figure 27:
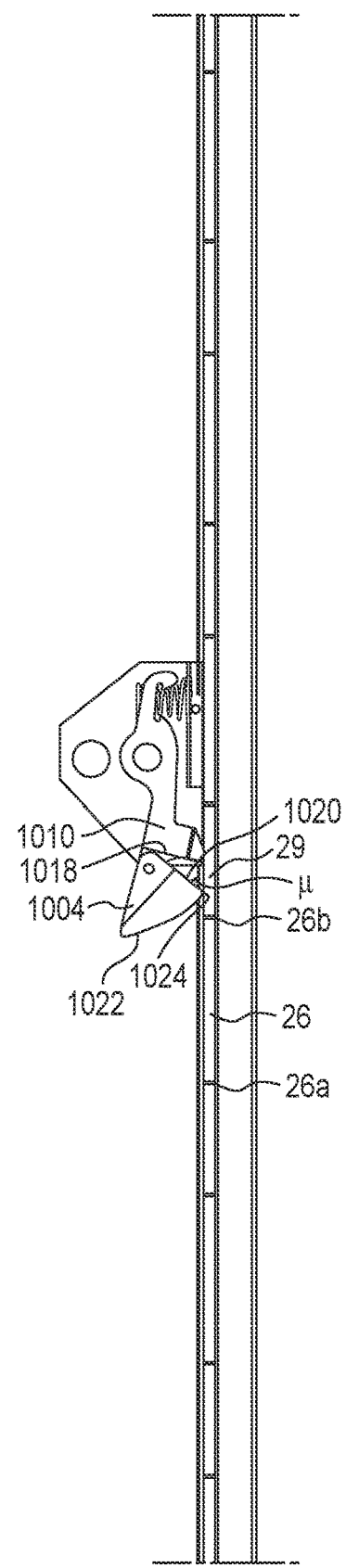

Next, the bracket 40 is raised along the track 20 until the fifth surface 1020 contacts the upper edge 26b of the aperture 26, which allows the contact between the third surface 1016 and the upper edge 26b of the aperture 26 to urge the latch 60 to rotate in the direction Y such that the latch 60 can be slid upwardly. The bracket 40 continues to slide upwardly, which causes the contact between the upper edge 26b of the aperture 26 and the fifth surface 1020 to urge the guide 1004 to rotate in the direction Y and out of contact with the fourth surface 1018, such that the latch 60 is free to slide vertically along the central portion 29 of the track 20 toward the aperture 24 (FIG. 27). When the latch 60 is moving upwardly along the central portion 29 of the track 20 between the apertures 24 and 26, because the fifth surface 1020 is longer than the fourth surface 1018, the connecting surface 1024 is biased against the aligned central portion 29 with the fifth surface 1020 extending at an acute angle μ with respect to a longitudinal axis of the track 20 (FIG. 27). The angle μ may be larger than the angle α.

Figure 28:
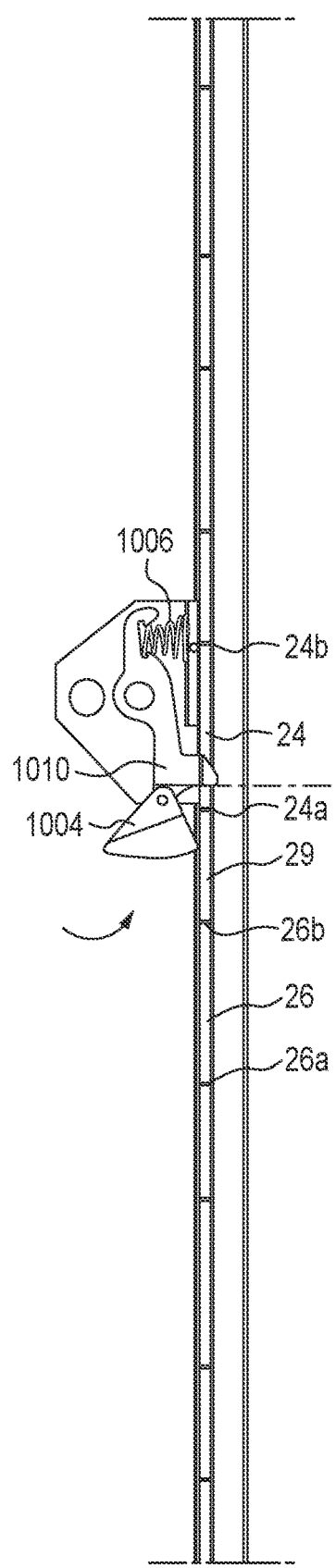

The bracket 40 is slid until the lower portion 1010 of the rotating portion 1002 is in registry with the aperture 24 and above the lower edge 24a. The lower portion 1010 is then urged through the aperture 24 due to the biasing force of the spring 1006 (FIG. 28). Then, the bracket 40 is lowered slightly from the vertical position (distance R) where the lower portion 1010 as extended into the aperture 24 so that the fourth surface 1018 of the rotating portion 1002 rests upon the lower edge 24a of the aperture 24 (FIG. 29) and the connecting surface 1024 is biased against the central portion 29 between the apertures 24 and 26 with the fifth surface extending at the angle α with respect to the longitudinal axis of the track 20. In this configuration, the weight of the beam assembly 100 is carried by the track 20 via the latch 60 and the bracket 40, and the beam assembly 100 can be loaded as desired.

A method of raising the end of the beam assembly 100, by raising the bracket 40 slidably mounted to the track 20 is discussed below, and is shown with reference to FIGS. 30-35. The method describes raising the bracket 40 to an aperture directly above the aperture that the bracket is aligned with in the initial condition of the method, but one of ordinary skill will understand that the method is equally applicable to raising the bracket across multiple apertures.

Figure 30:
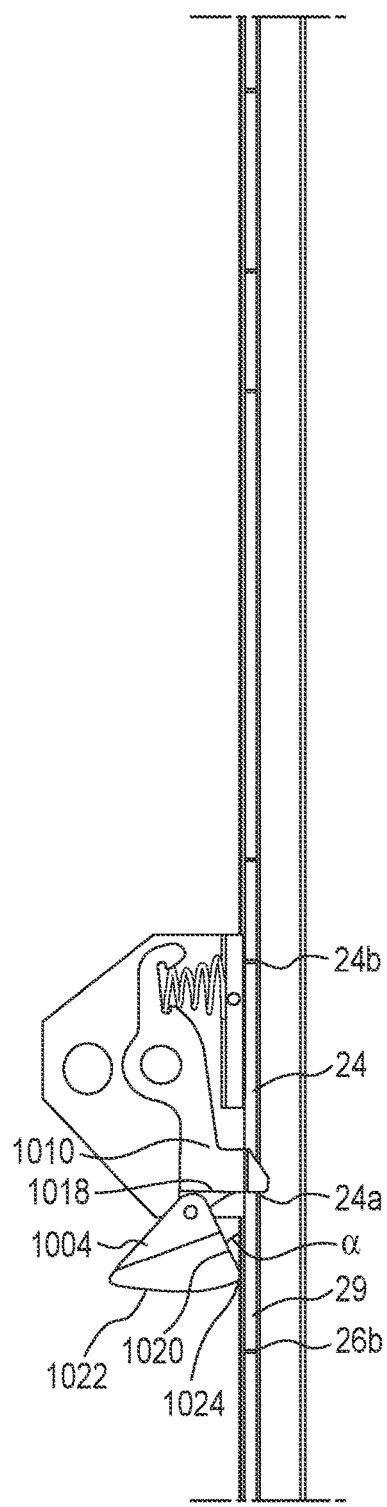
FIGS. 30-35 are illustrations showing side cross-sectional views of the bracket and the latch of FIG. 19 with respect to the track as the alignment of the bracket is raised from initial alignment with the aperture 24 to final alignment with the aperture 22 in accordance with certain aspects of the present disclosure.
Figure 31:
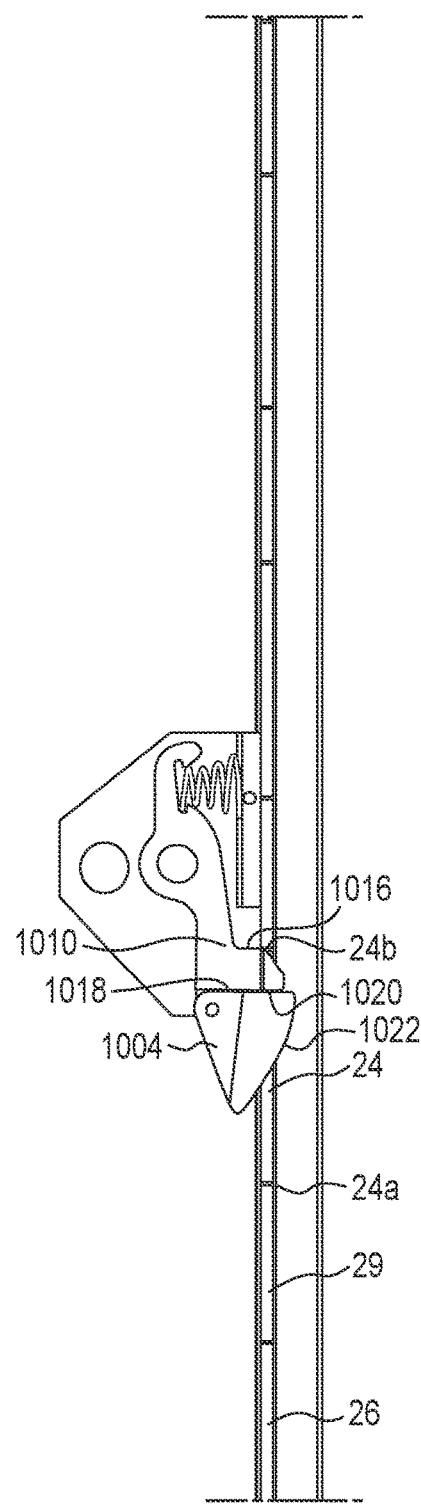

As depicted in FIGS. 30-31, the fourth surface 1018 of the rotating portion 1002 rests upon the lower edge 24a of the aperture 24 and an input is received to raise the bracket 40 to the aperture 22 above the aperture 24. The bracket 40 is raised until the connecting surface 1024 is clear of the lower edge 24a, and the spring 1028 urges the guide 1004 to rotate in the direction Z until the fourth and fifth surfaces 1018 and 1020 contact each other. At this position, a portion of the lower portion 1010 of the rotating portion 1002 and the guide 1004 extend through the aperture 24 as depicted in FIG. 31.

Figure 33:
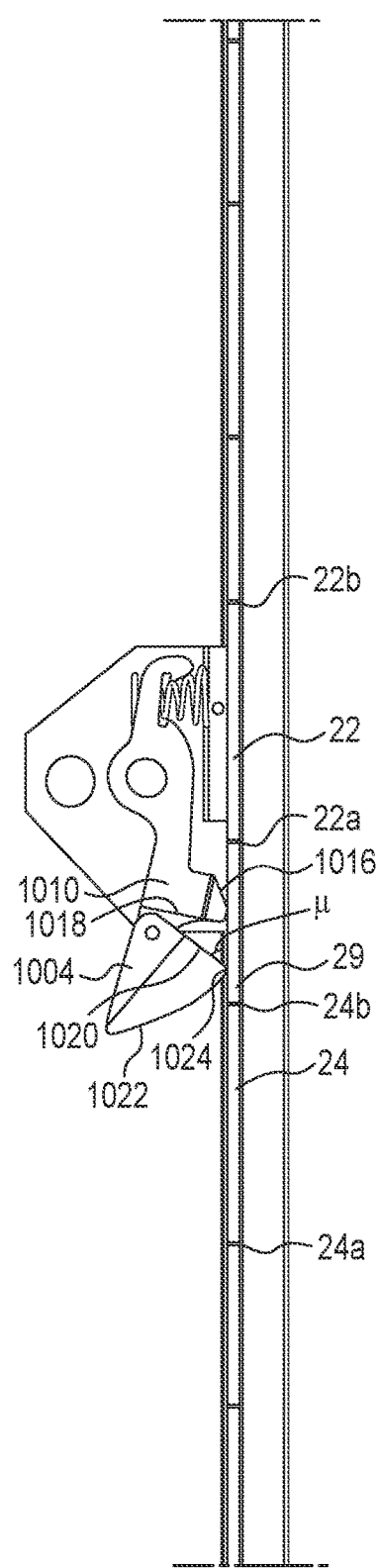

As the bracket 40 continues to raise, the biasing force of the spring 1006 urges the latch 60 to rotate in the direction Z until the third surface 1016 contacts the upper edge 24b of the aperture 24 (FIG. 31), which causes the rotating portion 1002 to rotate in the direction Y such that the rotating portion 1002 is free to slide vertically along the central portion 29 of the track 20 toward the aperture 22. Then the fifth surface 1020 contacts the upper edge 24b of the aperture 24, which causes the fifth surface 1020 to rotate in the direction Y and out of contact with the fourth surface 1018, such that the latch 60 is free to slide vertically along the central portion 29 of the track 20 toward the aperture 22. When the latch 60 is moving along the central portion 29 of the track 20 between the apertures 24 and 22, because the fifth surface 1020 is longer than the fourth surface 1018, the connecting surface 1024 is biased against the aligned central portion 29 with the fifth surface 1020 extending at an acute angle μ with respect to the longitudinal axis of the track 20 (FIG. 33). The angle μ may be larger than the angle α.

Figure 34:
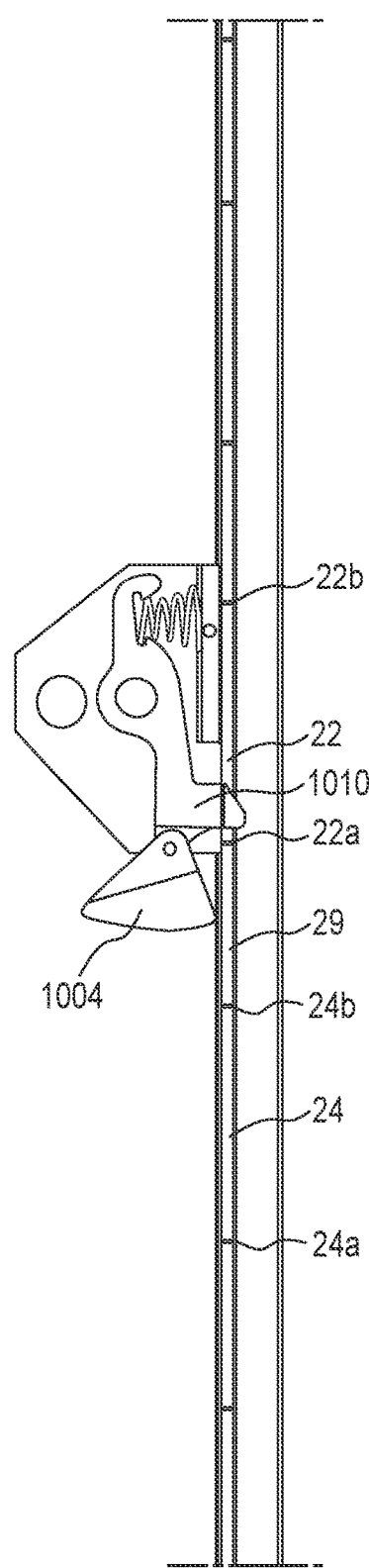
Figure 35:
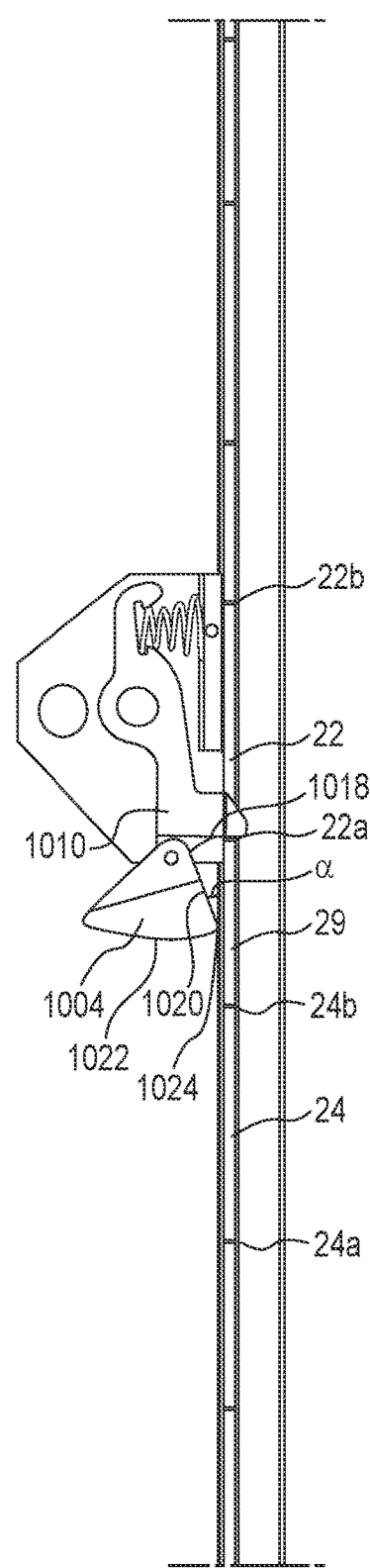

The bracket 40 is slid upwardly along the track 20 until the lower portion 1010 of the rotating portion 1002 is in registry with the aperture 22 and above the lower edge 22a. The lower portion 1010 is then urged through the aperture 22 due to the biasing force of the spring 1006 (FIG. 34). Then, the bracket 40 is lowered slightly from the vertical position (distance R) where the lower portion 1010 as extended into the aperture 22 so that the fourth surface 1018 of the rotating portion 1002 rests upon the lower edge 22a of the aperture 22 (FIG. 35) and the connecting surface 1024 is biased against the central portion 29 of the track 20 between the apertures 22 and 24 with the fifth surface 1020 extending at the angle α with respect to the longitudinal axis of the track 20. In this configuration, the weight of the beam assembly 100 is carried by the track 20 via the latch 60 and the bracket 40, and the beam assembly 100 can be loaded as desired.

While the preferred embodiments of the disclosed have been described, it should be understood that the invention is not so limited and modifications may be made without departing from the disclosure. For example, it is contemplated that the adjustable decking assembly according to the present disclosure may also be used outside vehicle compartments, such as in storage facilities. The scope of the disclosure is defined by the appended claims, and all devices that come within the meaning of the claims, either literally or by equivalence, are intended to be embraced therein.

The invention claimed is:

1. A latch for use with a remotely adjustable decking system to selectively position a bracket upon a track, comprising:
   a rotating portion rotatably mounted upon the bracket and is biased by a first spring; and
   a guide rotatably connected to the rotating portion and biased toward the rotating portion by a second spring.

2. The latch of claim 1, wherein the rotating portion comprises a lower portion comprising a third surface and a fourth surface, wherein the lower portion is configured to rest upon a lower edge of an aperture in the track when the bracket is horizontally aligned with the lower edge, such that the lower edge supports the bracket.

3. The latch of claim 1, wherein the guide comprises:
   a fifth surface;
   a sixth surface; and
   a connecting surface connecting the fifth and sixth surfaces together, wherein the fifth surface is biased by the second spring to contact a fourth surface of the rotating portion.

4. The latch of claim 1, wherein when the bracket is secured to the track, a portion of the rotating portion rests upon a lower edge of an aperture of the track, and a portion of the guide is biased against a central portion of the track, such that a triangular supporting structure is formed to support the bracket.

5. The latch of claim 2, wherein the rotating portion is biased in a first rotational direction by the first spring, and wherein the third surface of the rotating portion is configured to contact an upper edge of an aperture of the track such that when the bracket is raised vertically with respect to the track, the rotating portion is urged to rotate in a second rotational direction to allow the rotating portion to slide upwardly with respect to the track.

6. The latch of claim 3, wherein the rotating portion is biased in a first rotational direction by the first spring, and wherein the sixth surface of the guide is configured to contact a lower edge of an aperture of the track such that when the bracket is lowered vertically with respect to the track, the latch is urged to rotate in a second rotational direction to allow the latch to slide downwardly with respect to the track.

7. The latch of claim 3, wherein the guide is biased in a first rotational direction and toward the rotating portion by the second spring, and wherein the fifth surface of the guide is configured to contact an upper edge of an aperture of the track such that when the bracket is raised vertically with respect to the track, the guide is urged to rotate in a second rotational direction to allow the guide to slide upwardly with respect to the track.

8. The latch of claim 3, wherein when the bracket is secured to the track, a portion of the rotating portion rests upon a lower edge of an aperture of the track, and a portion of the guide is biased against a central portion of the track below the aperture, such that the connecting surface is biased against the central portion of the track below the aperture with the fifth surface of the guide extending at a first angle with respect to a longitudinal axis of the track.

9. The latch of claim 3, wherein the guide is biased in a first rotational direction and toward the rotating portion by the second spring, and wherein the fifth surface of the guide is longer than the fourth surface of the rotating portion of the latch, such that when the fifth surface contacts an upper edge of an aperture of the track, a further upward motion of the bracket causes the fifth surface to rotate in a second rotational direction and out of contact with the fourth surface of the rotating portion of the latch to provide clearance for the latch to slide upwardly with respect to the track.

10. The latch of claim 9, wherein when the bracket continues to raise, the latch is slid upwardly along a central portion of the track, and wherein the connecting surface of the guide is biased against the central portion of the track with the fifth surface extending at an acute angle with respect to a longitudinal axis of the track.

* * * * *